United States Patent
Kim et al.

(10) Patent No.: US 12,028,759 B2
(45) Date of Patent: Jul. 2, 2024

(54) METHOD AND APPARATUS FOR PERFORMING HANDOVER PROCEDURE IN WIRELESS COMMUNICATION SYSTEM

(71) Applicant: SAMSUNG ELECTRONICS CO., LTD., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 17/661,157

(22) Filed: Apr. 28, 2022

(65) Prior Publication Data

US 2022/0256413 A1 Aug. 11, 2022

Related U.S. Application Data

(63) Continuation of application No. 15/929,415, filed on Apr. 30, 2020, now abandoned.

(30) Foreign Application Priority Data

May 2, 2019 (KR) .................. 10-2019-0051827

(51) Int. Cl.
*H04W 36/00* (2009.01)
*H04W 76/15* (2018.01)
*H04W 76/19* (2018.01)
*H04W 76/27* (2018.01)
*H04W 80/02* (2009.01)

(52) U.S. Cl.
CPC ... *H04W 36/0069* (2018.08); *H04W 36/0072* (2013.01); *H04W 76/15* (2018.02); *H04W 76/19* (2018.02); *H04W 76/27* (2018.02); *H04W 80/02* (2013.01)

(58) Field of Classification Search
CPC . H04W 36/0069; H04W 76/19; H04W 76/15; H04W 76/27; H04W 36/0072; H04W 80/02
See application file for complete search history.

(56) References Cited

U.S. PATENT DOCUMENTS

2014/0254393 A1 9/2014 Yi et al.
2018/0124642 A1* 5/2018 Phuyal .............. H04W 28/0819
(Continued)

FOREIGN PATENT DOCUMENTS

KR 10-2018-0090658 A 8/2018

OTHER PUBLICATIONS

3GPP TSG-RAN WG2 Meeting #105bis R2-1904662 (Year: 2019).*
(Continued)

*Primary Examiner* — Ricky Q Ngo
*Assistant Examiner* — Stephen N Steiner

(57) ABSTRACT

A method performed by a terminal in a wireless communication system includes: receiving, from a base station, a radio resource control (RRC) reconfiguration message including configuration information for conditional handover; identifying a cell for conditional handover based on the configuration information for conditional handover; and triggering a packet data convergence protocol (PDCP) status report for a radio bearer, according to an execution of a conditional handover for the identified cell for conditional handover.

10 Claims, 24 Drawing Sheets

(56) References Cited

U.S. PATENT DOCUMENTS

2018/0279193 A1\* 9/2018 Park .................... H04W 76/27
2020/0053600 A1 2/2020 Jang et al.

OTHER PUBLICATIONS

International Search Report and Written Opinion of the International Searching Authority in connection with International Application No. PCT/KR2020/005671 dated Aug. 6, 2020, 9 pages.
Ericsson, "User plane aspects of conditional handover," R2-1901089, 3GPP TSG RAN WG2 #105, Athens, Greece, Feb. 25-Mar. 1, 2019, 5 pages.
Huawei, et al., "Considerations on configurations of CHO target cells," R2-1904851, 3GPP TSG-RAN WG2 Meeting #105bis, Xi'an, China, Apr. 8-12, 2019, 8 pages.
OPPO, "Further details on eMBB-based handover for NR mobility," R2-1903307, 3GPP TSG-RAN WG2 Meeting #105bis, Xi'an, China, Apr. 8-12, 2019, 5 pages.
Qualcomm Incorporated, "LTE Conditional HO design considerations," R2-1904662, 3GPP TSG-RAN WG2 Meeting #105bis, Xi'an, China, Apr. 8-12, 2019, 9 pages.

\* cited by examiner

METHOD AND APPARATUS FOR PERFORMING HANDOVER PROCEDURE IN WIRELESS COMMUNICATION SYSTEM

CROSS-REFERENCE TO RELATED APPLICATION

This application is a continuation of U.S. application Ser. No. 15/929,415, filed Apr. 30, 2020, which is based on and claims priority under 35 U.S.C. § 119 to Korean Patent Application No. 10-2019-0051827, filed on May 2, 2019, in the Korean Intellectual Property Office, the disclosure of which is incorporated by reference herein in its entirety.

BACKGROUND

1. Field

The disclosure relates to a method and apparatus for performing a handover procedure in a wireless communication system.

Also, the disclosure relates to a method and apparatus for processing communication data in a wireless communication system.

2. Description of Related Art

To meet the increasing demand for wireless data traffic after the commercialization of $4^{th}$ Generation (4G) communication systems, efforts to develop enhanced $5^{th}$ Generation (5G) communication systems or pre-5G communication systems are continuing. For this reason, a 5G communication system or pre-5G communication system is called a Beyond 4G Network communication system or a Post Long Term Evolution (LTE) system.

To achieve a high data transmission rate, the implementation of a 5G communication system in an ultra-high-frequency millimeter wave (mmWave) band (for example, a 60 GHz band) is being considered. To reduce path loss of radio waves and increase a transfer distance of radio waves in an ultra-high-frequency band, in a 5G communication system, technologies for beamforming, massive Multiple Input Multiple Output (MIMO), Full Dimensional MIMO (FD-MIMO), array antenna, analog beam-forming, and large-scale antenna are being discussed.

Also, to improve the network of the system, various technologies, such as advanced small cell, cloud radio access network (cloud RAN), ultra-dense networks, Device to Device communication (D2D), wireless backhaul, moving networks, cooperative communication, Coordinated Multi-Points (CoMP), and interference cancellation, have been developed for 5G communication systems. In addition, other technologies, such as hybrid frequency shift keying (FSK) and quadrature amplitude modulation (QAM) Modulation (FOAM) and Sliding Window Superposition Coding (SWSC) based on Advanced Coding Modulation (ACM) and Non Orthogonal Multiple Access (NOMA) and Sparse Code Multiple Access (SCMA) based on Filter Bank Multi Carrier (FBMC), have been developed for 5G communication systems.

Meanwhile, the Internet is evolving from a human-centered network in which humans generate and consume information to an Internet of Things (IoT) network in which distributed components such as objects transmit, receive, and process information. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, Machine to Machine (M2M), and Machine Type Communication (MTC) for connections between objects have been studied. In an IoT environment, an intelligent Internet Technology (IT) service is provided to collect and analyze data generated by connected objects to create new value for human life. The IoT may be applied to various fields, such as smart homes, smart buildings, smart cities, smart cars/connected cars, smart grids, health care, smart appliances, and advanced medical services, through convergence and combination between existing Information Technology (IT) and various industries.

Accordingly, various attempts to apply a 5G communication system to an IoT network are being made. For example, technologies, such as a sensor network, M2M, and MTC, are implemented by technologies, such as beam forming, MIMO, and array antenna, which are 5G communication technologies. Applying a cloud radio access network (CRAN) as big data processing technology is also an example of the convergence of 5G technology and IoT technology.

With the development of wireless communication systems as described above, various services are being provided. Therefore, a method for stably supporting services related to, particularly, handover of a user equipment (UE) is required.

SUMMARY

The disclosure provides an apparatus and method capable of effectively providing a service in a mobile communication system.

Additional aspects will be set forth in part in the description which follows and, in part, will be apparent from the description, or may be learned by practice of the presented embodiments of the disclosure.

According to an embodiment of the disclosure a method performed by a terminal in a wireless communication system includes: receiving, from a base station, a radio resource control (RRC) reconfiguration message including configuration information for conditional handover; identifying a cell for conditional handover based on the configuration information for conditional handover; and triggering a packet data convergence protocol (PDCP) status report for a radio bearer, according to an execution of a conditional handover for the identified cell for conditional handover.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2IB shows RLC header formats that may be applied in a 2-1 embodiment, and are operations of a reception RLC layer in which an RLC UM mode according to an embodiment of the disclosure is set;

DETAILED DESCRIPTION

Figure 1A:
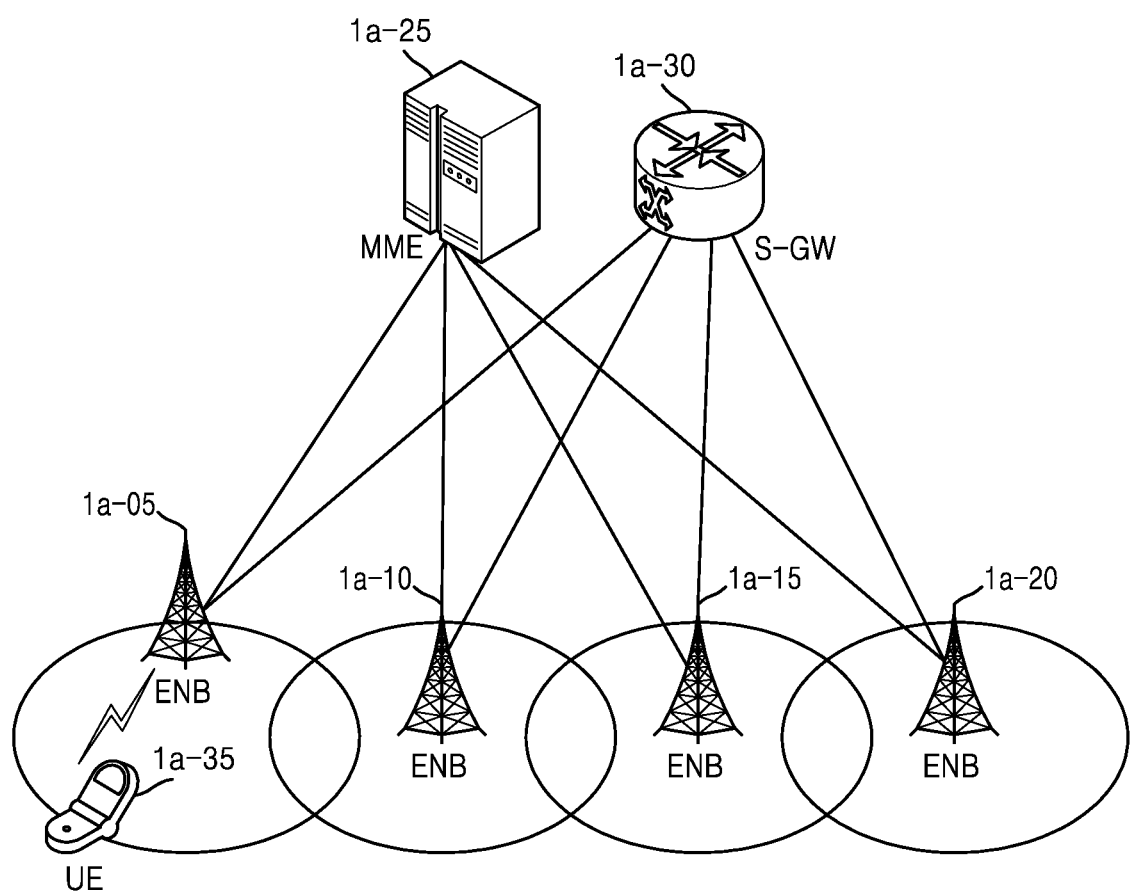
FIG. 1A shows a structure of a long term evolution (LTE) system to which an embodiment of the disclosure may be applied.

FIGS. 1A through 2M, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an operation principle of an embodiment of the disclosure will be described in detail with reference to the accompanying drawings. However, when detailed descriptions about known functions or configurations associated with the disclosure are determined to unnecessarily obscure the gist of the disclosure, the detailed descriptions will be omitted. Although the following terms are defined in consideration of the functions of the disclosure, they may vary according to a user or operator's intentions, judicial precedents, etc. Hence, the terms must be defined based on the contents of the entire specification.

Throughout the disclosure, the expression "at least one of a, b or c" indicates only a, only b, only c, both a and b, both a and c, both b and c, all of a, b, and c, or variations thereof.

Examples of a terminal may include a User Equipment (UE), a Mobile Station (MS), a cellular phone, a smartphone, a computer, a multimedia system capable of performing a communication function, or the like.

In the disclosure, a controller may also be referred to as a processor.

Throughout the specification, a layer (or a layer) may also be referred to as an entity.

When detailed descriptions about known functions or configurations associated with the disclosure are determined to unnecessarily obscure the gist of the disclosure, the detailed descriptions will be omitted. Hereinafter, an embodiment of the disclosure will be described with reference to the accompanying drawings.

In the following descriptions, the terms used to identify connected nodes, the terms indicating network entities, the terms indicating messages, the terms indicating interfaces between network objects, the terms indicating various identification information, etc. are examples for convenience of description. Accordingly, an embodiment of the disclosure is not limited to these terms, and other terms having the equivalent technical meaning may be used.

For convenience of description, an embodiment of the disclosure uses terms and names defined in a $3^{rd}$ Generation Partnership Project Long Term Evolution (3GPP LTE) standard and/or a $3^{rd}$ Generation Partnership Project New Radio (3GPP NR) standard. However, an embodiment of the disclosure is not limited to the terms and names, and may be applied in the same way to a system based on another standard. In an embodiment of the disclosure, evolved Node B (eNB) is mixed with next generation Node B (gNB) for convenience of description. That is, a base station mentioned as an eNB may represent a gNB. Also, the term UE may represent other wireless communication devices, as well as mobile phones, NB-IoT devices, and sensors.

A post LTE communication system, that is, a $5^{th}$ Generation (5G) communication system needs to freely reflect various requirements from users and service providers. Therefore, the 5G communication system needs to support services satisfying various requirements simultaneously. Examples of services considered for the 5G communication system are Enhanced Mobile BroadBand (eMBB), massive Machine Type Communication (mMTC), and Ultra Reliability Low Latency Communication (URLLC).

According to an embodiment of the disclosure, the eMBB is aimed to provide a data rate that is higher than a data rate supported by existing LTE, LTE-A or LTE-Pro. For example, in a 5G communication system, the eMBB needs to provide a peak data rate of 20 Gbps in a downlink and a peak data rate of 10 Gbps in an uplink with respect to a base station. Also, the 5G communication system needs to provide a high user perceived data rate, while providing a peak data rate. To satisfy the requirements, the 5G communication system requires an improvement of various transmission/reception technologies including enhanced Multi Input Multi Output (MIMO) transmission technology. Also, existing LTE transmits signals by using a transmission bandwidth of maximally 20 MHz in a 20 GHz band, whereas the 5G communication system uses a wider frequency bandwidth than 20 MHz in a frequency band of 3 to 6 GHz or more, thereby satisfying a required data rate.

Simultaneously, mMTC is considered to support an application service such as Internet of Thing (IoT) in the 5G communication system. The mMTC may require supporting connections of massive UEs (a large number of UEs) in a cell, UE coverage enhancement, an improved battery lifetime, UE cost reduction, etc. to efficiently provide the IoT. The IoT is connected to various sensors and devices to provide a communication function. Therefore, the IoT needs to support a large number of UEs (for example, 1,000,000 UEs/km$^2$) in a cell. Also, because a UE supporting the mMTC has a high probability of being located in a shadow zone such as the basement of a building, which is not covered by a cell, due to its service characteristics, the UE may require wide coverage compared to those required by other services that a 5G communication system provides. The UE supporting the mMTC needs to be a low-cost UE, and requires a long battery lifetime of about 10 years to 15 years because it has difficulties in frequently replacing the batteries.

Finally, URLLC which is a mission-critical cellular-based wireless communication service may be used in services of remote control for robots or machinery, industrial automation, unmanned aerial vehicle, remote health care, emergency alert, etc. Accordingly, communication provided by the URLLC may need to satisfy ultra-low latency and ultra reliability. For example, a service supporting the URLLC needs to satisfy air interface latency that is shorter than 0.5 milliseconds, and simultaneously, the service may have a requirement of a packet error rate that is equal to or lower than $10^{-5}$. Accordingly, for services supporting the URLLC, the 5G system needs to provide a smaller Transmit Time Interval (TTI) than other services, and simultaneously, the 5G system requires a design of assigning a wide resource in a frequency band to secure reliability of a communication link.

Three services (that is, eMBB, URLLC, and mMTC) which are considered in the above-described 5G communication system may be multiplexed in a system and transmitted. In this case, to satisfy different requirements of the services, the services may use different transmission/reception methods and different transmission/reception parameters. However, the above-described mMTC, URLLC, and eMBB are examples of different services types, and service types to which the disclosure is applied are not limited to the above-described examples.

Also, hereinafter, embodiments of the disclosure are described based on examples of LTE, LTE-A, LTE Pro, or a 5G (or NR, next-generation mobile communication) system, however, the embodiments of the disclosure may be applied to other communication systems having similar technical backgrounds or channel types. Also, the embodiments of the disclosure may be applied to other communication systems through slight modifications within a range that does not greatly deviate from the scope of the disclosure, under a determination of a person having a skilled technical knowledge.

As described below, the disclosure proposes a conditional handover method that is efficient in a next-generation mobile communication system. According to an embodiment of the disclosure, an issue that a source gNB starts late data forwarding to a target gNB and an issue caused when a source gNB fails to recognize a connection release time of a UE may be overcome.

The next-generation mobile communication system may support various handover methods for reducing a data interruption time that may be caused when a handover occurs. Particularly, according to a conditional handover procedure, a source gNB sets a condition for a UE together with a plurality of target gNB candidates, and the UE checks signals from the target gNB candidates based on the condition to select a target gNB candidate from among the plurality of target gNB candidates as a target gNB, thereby starting a handover procedure. Accordingly, because the source gNB is not capable of expecting a target gNB to which the UE will perform a handover, the source gNB starts late data forwarding to the target gNB, and also the source gNB may not recognize a time at which the UE releases a connection to the source gNB.

Hereinafter, a method and apparatus for performing a handover procedure according to an embodiment of the disclosure will be described with reference to FIGS. 1A to 1J.

FIG. 1A shows a structure of an LTE system to which an embodiment of the disclosure may be applied.

Referring to FIG. 1A, a radio access network of the LTE system may be configured with next-generation Evolved Nodes B (ENBs) (hereinafter, also referred to as Nodes B or base stations) 1a-05, 1a-10, 1a-15, and 1a-20, a Mobility Management Entity (MME) 1a-25, and a Serving-Gateway (S-GW) 1a-30. A UE (hereinafter, also referred to as a terminal) 1a-35 may be connected to an external network through the ENBs 1a-05 to 1a-20 and the S-GW 1a-30.

In FIG. 1A, the ENBs 1a-05 to 1a-20 may correspond to existing nodes B of a Universal Mobile Telecommunication System (UMTS). The ENBs 1a-05 to 1a-20 may be connected to the UE 1a-35 through a wireless channel, and perform more complicated functions than the existing nodes B. In the LTE system, because all user traffics including a real-time service such as Voice over IP (VoIP) are serviced through a shared channel, a device for performing scheduling by collecting status information of UEs, such as buffer statuses of UEs, available transmission power states of UEs, channel states of UEs, etc., is needed. The ENBs 1a-05 to 1a-20 may function as such a device. An ENB may generally control a plurality of cells. For example, to implement a transmission speed of 100 Mbps, the LTE system uses, as radio access technology, Orthogonal Frequency Division Multiplexing (OFDM), for example, in a bandwidth of 20 MHz. Also, Adaptive Modulation & Coding (AMC) of determining a modulation scheme and a channel coding rate according to a channel state of a UE may be applied. The S-GW 1a-30, which is a device for providing data bearers, may generate or remove data bearers according to a control of the MME 1a-25. The MME 1a-25 may be in charge of various control functions, as well as a mobility management function for UEs, and may be connected to a plurality of ENBs.

Figure 1B:
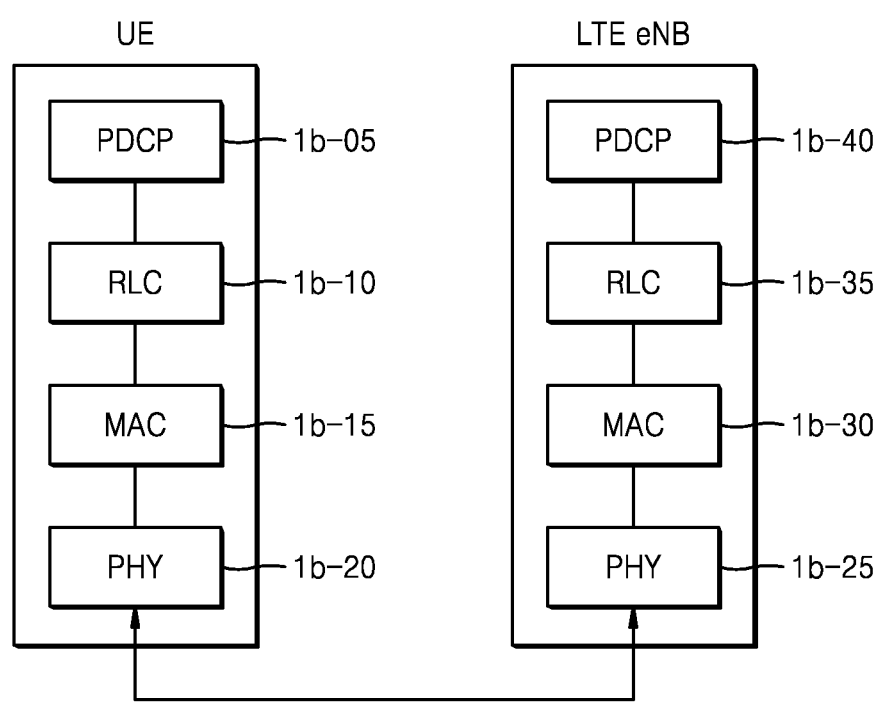
FIG. 1B shows a radio protocol architecture of an LTE system to which an embodiment of the disclosure may be applied.

FIG. 1B shows a radio protocol architecture of an LTE system to which an embodiment of the disclosure may be applied.

Referring to FIG. 1B, radio protocols of the LTE system may include Packet Data Convergence Protocols (PDCPs) 1b-05 and 1b-40, Radio Link Control (RLC) 1b-10 and 1b-35, and Medium Access Control (MAC) 1b-15 and 1b-30 of an UE and an ENB. The PDCPs 1b-05 and 1b-40 may be in charge of operations of IP header compression/restoration. Main functions of the PDCPs 1b-05 and 1b-40 may be summarized as follows.

Header compression and decompression: ROHC only
Transfer of user data
In-sequence delivery of upper layer PDUs at PDCP re-establishment procedure for RLC AM For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC 1b-10 and 1b-35 may reconstruct a PDCP Packet Data Unit (PDU) to an appropriate size to perform an ARQ operation, etc. Main functions of the RLC 1b-10 and 1b-35 may be summarized as follows.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 1b-15 and 1b-30 may be connected to several RLC layers configured in the UE, and perform an operation of multiplexing RLC PDUs into a MAC PDU and demultiplexing RLC PDUs from a MAC PDU. Main functions of the MAC 1b-15 and 1b-30 may be summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical layers (PHY) 1b-20 and 1b-25 may perform an operation of performing channel coding and modulation on upper layer data to generate an OFDM symbol and transmitting the OFDM symbol through a wireless channel, or an operation of demodulating an OFDM symbol received through the wireless channel, performing channel decoding on the OFDM symbol, and transferring the channel-decoded OFDM symbol to an upper layer.

Figure 1C:
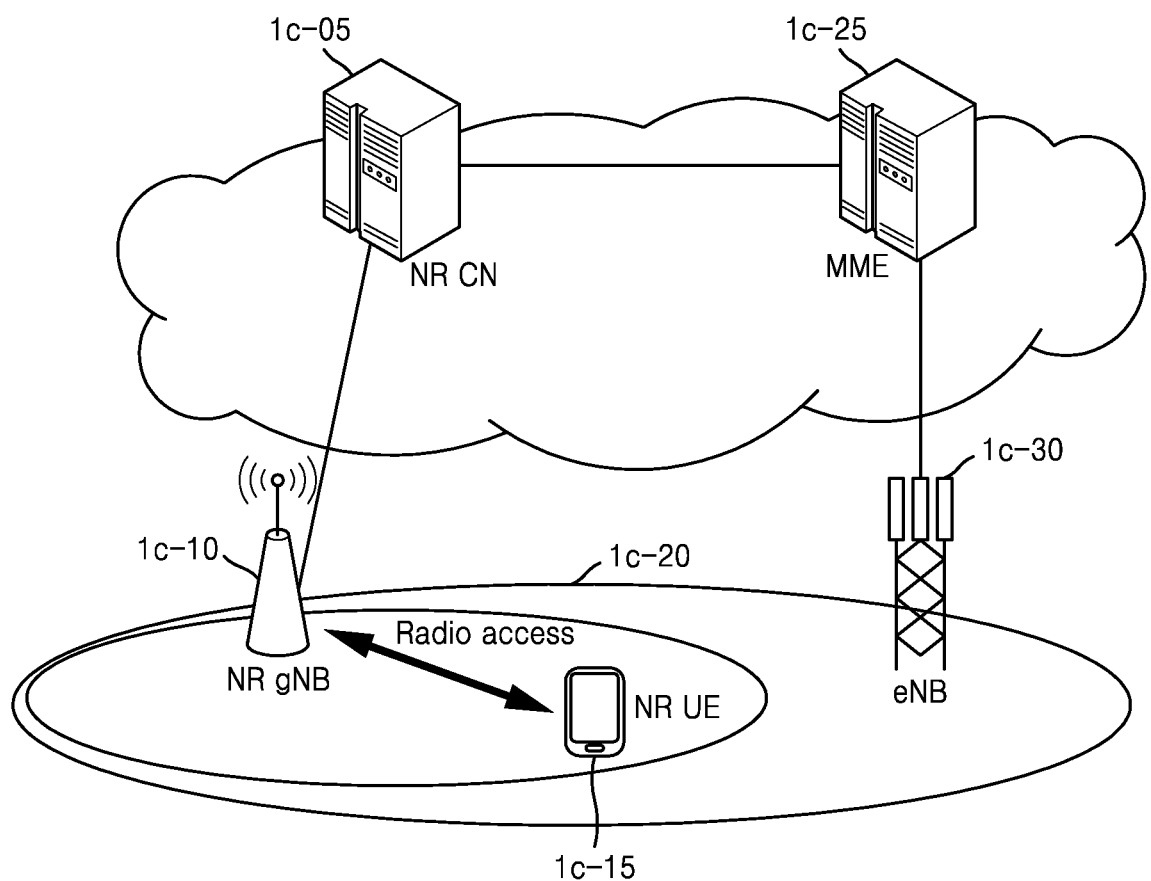
FIG. 1C shows a structure of a next-generation mobile communication system to which an embodiment of the disclosure may be applied.

FIG. 1C shows a structure of a next-generation mobile communication system to which an embodiment of the disclosure may be applied.

Referring to FIG. 1C, a radio access network of a next-generation mobile communication system (hereinafter, referred to as NR or 5G) may be configured with a next-generation New Radio Node B (NR gNB) (also, referred to as a NR base station) 1c-10 and a New Radio Core Network (NR CR) 1c-05. A New Radio User Equipment (NR UE) (also, referred to as a UE) 1c-15 may be connected to an external network through the NR gNB 1c-10 and the NR CN 1c-05.

In FIG. 1C, the NR gNB 1c-10 may correspond to an Evolved Node B (eNB) of an existing LTE system. The NR gNB 1c-10 may be connected to the NR UE 1c-15 through a wireless channel, and provide a more excellent service than an existing node B. In a next-generation mobile communication system, because all user traffics are serviced through a shared channel, a device for performing scheduling by collecting status information of UEs, such as buffer statuses of UEs, available transmission power states of UEs, channel states of UEs, etc., is needed. The NR gNB 1c-10 may function as such a device. A NR gNB may generally control a plurality of cells. To implement ultra high-speed data transmission compared to existing LTE, OFDM as radio access technology may be combined with beam-forming technology, while providing an existing maximum bandwidth or more.

Also, AMC of determining a modulation scheme and a channel coding rate according to a channel state of a UE may be applied. The NR CN 1c-05 may perform functions, such as mobility support, bearer setup, Quality of Service (QoS) setup, etc. The NR CN 1c-05 may be in charge of various control functions, as well as a mobility management function for UEs, and may be connected to a plurality of base stations. Also, the next-generation mobile communication system may interwork with an existing LTE system, and the NR CN 1c-05 may be connected to the MME 1c-25 through a network interface. The MME 1c-25 may be connected to an eNB 1c-30 which is an existing base station.

Figure 1D:
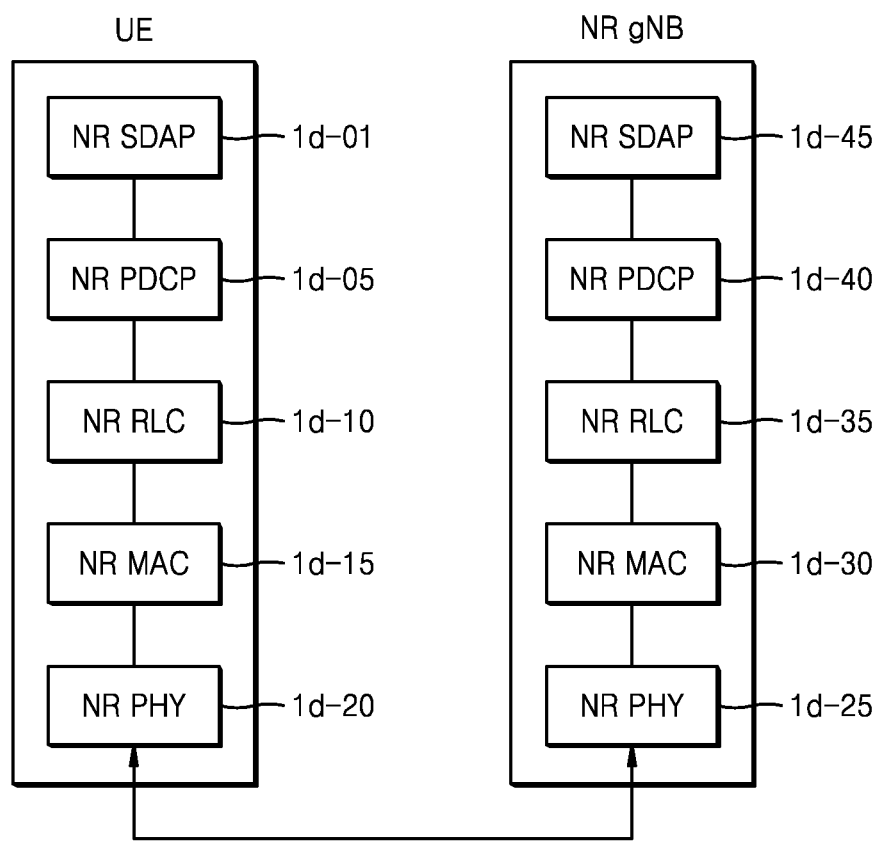
FIG. 1D shows a radio protocol architecture of a next-generation mobile communication system to which an embodiment of the disclosure may be applied.

FIG. 1D shows a radio protocol architecture of a next-generation mobile communication system to which an embodiment of the disclosure may be applied.

Referring to FIG. 1D, radio protocols of the next-generation mobile communication system may include NR SDAPs 1d-01 and 1d-45, NR PDCPs 1d-05 and 1d-40, NR RLC 1d-10 and 1d-35, and NR MAC 1d-15 and 1d-30 of an UE and a NR gNB.

Main functions of the NR SDAPs 1d-01 and 1d-45 may include some of the following functions.

Transfer of user plane data
Mapping between a QoS flow and a DRB for both DL and UL
Marking QoS flow ID in both DL and UL packets
Reflective QoS flow to DRB mapping for the UL SDAP PDUs In regard of a SDAP layer as described above, the UE may receive, as an RRC message, a setting about whether to use a header of the SDAP layer or whether to use a function of the SDAP layer for each PDCP layer, for each bearer, or for each logical channel. When a SDAP header is set, the SDAP header capable of indicating the UE to update or reset mapping information about a QoS flow and a data bearer of a uplink and a downlink with a 1-bit indicator NAS reflective QoS for a NAS reflective QoS setting and a 1-bit indicator AS reflective QoS for an AS reflective QoS setting of the SDAP header may include QoS flow ID information representing QoS. QoS information described above may be used as data processing priority, scheduling information, etc. for supporting a stable service.

Main functions of the NR PDCPs 1d-05 and 1d-40 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of a NR PDCP device among the above-mentioned functions means a function of reordering PDCP PDUs received from a lower layer in order based on PDCP Sequence Numbers (SNs), and may include a function of transferring data to an upper layer in the reordered order. Alternatively, the reordering function of the NR PDCP device may include a function of directly transferring data regardless of order, a function of reordering and recording lost PDCP PDUs, a function of sending a status report for lost PDCP PDUs to a transmitter, and a function of requesting retransmission of lost PDCP PDUs.

Main functions of the NR RLC 1d-10 and 1d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of a NR RLC device among the above-mentioned functions means a function of transferring RLC SDUs received from a lower layer in order to an upper layer, and may include a function of reassembling, when a RLC SDU is segmented into several RLC SDUs and received, the RLC SDUs and transferring a result of the reassembling, a function of reordering received RLC PDUs based on RLC SNs or PDCP SNs, a function of reordering and recording lost RLC PDUs, a function of sending a status report for lost RLC PDUs to a transmitter, a function of requesting retransmission of lost RLC PDUs, a function of transferring, when there are lost RLC SDUs, RLC SDUs before the lost RLC SDUs in order to the upper layer, a function of transferring, when a preset timer has been expired although there are lost RLC SDUs, all RLC SDUs received before the preset timer starts in order to the upper layer, or a function of transferring, when the preset time has been expired although there are lost RLC SDUs, all RLC SDUs received up to now in order to the upper layer.

Also, RLC PDUs may be processed in order (in arrival order, regardless of SNs or order of SNs) in which they are received, and transferred to the PDCP device out of sequence delivery, and in the case of segments, segments which have been stored in a buffer or which are to be received later may be received and reconstructed as a compete RLC PDU and then processed and transferred to the PDCP device. A NR RLC layer as described above may include no concatenation function, and the above-described function may be performed in a NR MAC layer or replaced with a multiplexing function of the NR MAC layer.

The out-of-sequence delivery function of the NR RLC device as described above means a function of transferring RLC SDUs received from a lower layer to the upper layer regardless of order, and may include a function of reassembling, when a RLC SDU is segmented into several RLC SDUs and received, the RLC SDUs and transferring a result of the reassembling, and a function of storing and ordering RLC SNs or PDCP SNs of the received RLC PDUs and recording lost RLC PDUs.

The NR MAC 1d-15 and 1d-30 may be connected to several NR RLC layers configured in the UE, and main functions of the NR MAC 1d-15 and 1d-30 may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR PHY layers 1d-20 and 1d-25 may perform an operation of performing channel coding and modulation on upper layer data to generate an OFDM symbol and transferring the OFDM symbol through a wireless channel, or performing demodulation and channel decoding on an OFDM symbol received through the wireless channel and transferring a result of the modulation and channel decoding to an upper layer.

Figure 1E:
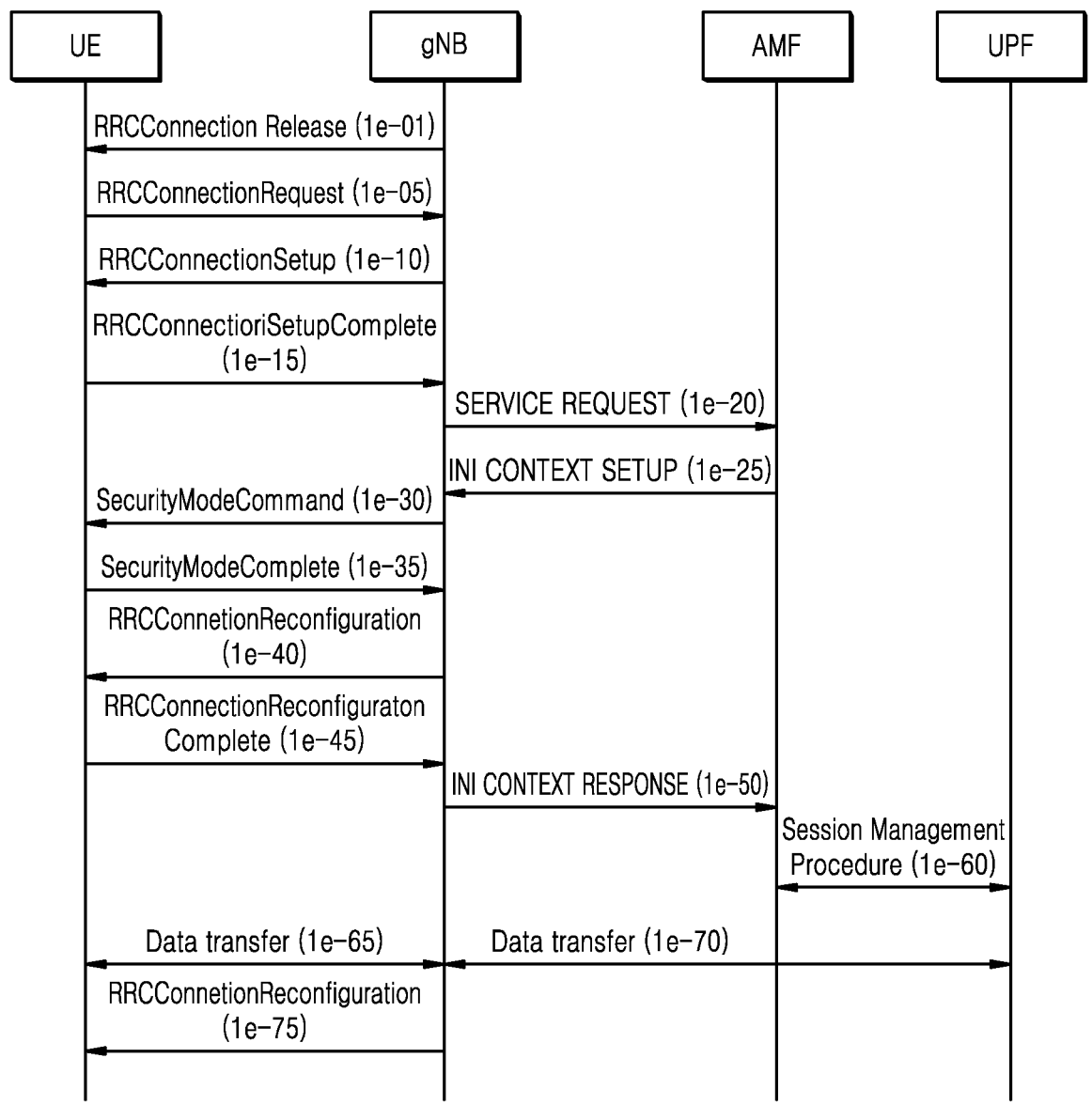
FIG. 1E is a view for describing a procedure in which a next generation Node B (gNB) according to an embodiment of the disclosure releases a connection of a user equipment (UE) for the UE to change from a Radio Resource Control (RRC) connected mode to an RRC idle mode and a procedure in which the UE sets up a connection to the gNB to change from the RRC idle mode to the RRC connected mode.

FIG. 1E is a view for describing a procedure in which a gNB according to an embodiment of the disclosure releases a connection of an UE for the UE to change from an RRC connected mode to an RRC idle mode and a procedure in which the UE sets up a connection to the gNB to change from the RRC idle mode to the RRC connected mode.

Referring to FIG. 1E, when the UE transmitting and receiving data receives or transmits no data for a certain reason or for a preset time in an RRC connected mode, the gNB may transmit an RRCConnectionRelease message to the UE to change the UE to the RRC idle mode, in operation 1e-01. The UE (hereinafter, also referred to as an idle mode UE) in which no connection is currently established may perform, when data to be transmitted is generated, an RRC connection establishment process together with the gNB. The UE may establish reverse transmission synchronization with the gNB through a random access process, and transmit an RRCConnectionRequest message to the gNB, in operation 1e-05. The RRCConnectionRequest message may include an identifier of the UE and a cause establishment-Cause for connection establishment.

The gNB may transmit an RRCConnectionSetup message to the UE to enable the UE to establish an RRC connection, in operation 1e-10. The RRCConnectionSetup message may include RRC connection configuration information, etc. Also, the RRCConnectionSetup message may include at least one information of bearer configuration information of the UE, configuration information of a PHY layer, configuration information of a MAC layer, configuration information of a RLC layer, configuration information of a PDCP layer, or configuration information of a SDAP layer.

Also, the configuration information of the PDCP layer may include an indicator indicating whether to trigger a PDCP status report in an RLC UM (unacknowledged mode) mode or an RLC AM (acknowledged mode) mode. The indicator may be an indicator indicating the PDCP layer to generate, configure, and transmit a PDCP status report when a PDCP re-establishment procedure is performed. When the above-described indicator is included in an RRC message, the UE may trigger, configure, and transmit a PDCP status report for a bearer corresponding to the PDCP layer. According to another method, when the above-described indicator is set, the UE may trigger, configure, and transmit a PDCP status report at the PDCP layer in the case that a conditional handover is indicated. According to another method, when the above-described indicator is set, the UE may trigger and configure a PDCP status report at the PDCP layer and transmit the PDCP status report to a target gNB in the case that a handover is indicated. According to another method, when the above-described indicator is set, the UE may trigger and configure a PDCP status report at the PDCP layer and transmit the PDCP status report to a source gNB in the case that a handover is indicated.

An RRC connection is also referred to as a Signaling Radio Bearer (SRB), and may be used to transmit and receive an RRC message which is a control message between a UE and a gNB. The UE which has established an RRC connection may transmit an RRCConnetionSetupComplete message to the gNB, in operation 1e-15. The RRCConnetionSetupComplete message may include a SERVICE REQUEST message as a control message through which the UE requests the MME to set a bearer for a preset service.

The gNB may transmit the SERVICE REQUEST message included in the RRCConnetionSetupComplete message to an Access and Mobility Management Function (AMF), in operation 1e-20, and the AMF may determine whether to provide the preset service requested by the UE. When the AMF determines to provide the preset service requested by the UE, the AMF may transmit an INITIAL CONTEXT SETUP REQUEST message to the gNB, in operation 1e-25. The INITIAL CONTEXT SETUP REQUEST message may include QoS information to be applied for a Data Radio Bearer (DRB) setting, security-related information (for example, a security key or a security algorithm) to be applied to the DRB, etc.

The gNB may exchange a SecurityModeCommand message with a SecurityModeComplete message to set security with the UE, in operations 1e-30 and 1e-35. When a security setting is completed, the gNB may transmit an RRCConnectionReconfiguration message to the UE, in operation 1e-40.

Also, the RRCConnectionReconfiguration message may include bearer configuration information, configuration information of the PHY layer, configuration information of the MAC layer, configuration information of the RLC layer, configuration information of the PDCP layer, or configuration information of the SDAP layer.

Also, the configuration information of the PDCP layer may include an indicator indicating whether to trigger a PDCP status report in the RLC UM mode or the RLC AM mode. The indicator may indicate the PDCP layer to generate, configure, and transmit a PDCP status report when a PDCP re-establishment procedure is performed. When the indicator is included in an RRC message, the UE may trigger, configure, and transmit a PDCP status report for a bearer corresponding to the PDCP layer. According to another method, when the indicator is set, the UE may trigger and configure a PDCP status report at the PDCP layer and transmit the PDCP status report, in the case that a conditional handover is indicated. According to another method, when the indicator is set, the UE may trigger and configure a PDCP status report at the PDCP layer and transmit the PDCP status report to a target gNB, in the case that a handover is indicated. According to another method, when the indicator is set, the UE may trigger and configure a PDCP status report at the PDCP layer and transmit the PDCP status report to a source gNB, in the case that a conditional handover is indicated.

The RRCConnectionReconfiguration message may include configuration information of a DRB by which user data is to be processed, and the UE may apply the configuration information of the DRB to set up the DRB, and transmit an RRCConnectionReconfigurationComplete message to the gNB, in operation 1e-45.

The gNB may set up the DRB with the UE and then transmit an initial context setup complete message to the AMF, in operation 1e-50. The AMF may receive the initial context setup complete message, and perform a session management procedure with a User Plane Function (UPF) to establish a PDU session, in operation 1e-60. When the above-described process is completed, the UE may transmit/receive data to/from the gNB through the UPF, in operations 1e-65 and 1e-70.

As described above, a general data transmission process may be configured with three operations of RCC connection setup, security setup, and DRB setup. Also, the gNB may transmit an RRCConnectionReconfiguration message to newly set up, add, or change a setting to the UE for a certain reason, in operation 1e-75.

According to an embodiment of the disclosure, the bearer may have a meaning including a SRB and a DRB, wherein the SRB means a Signaling Radio Bearer and the DRB means a Data Radio Bearer. The SRB may be mainly used to transmit and receive RRC messages of the RRC layer, and the DRB may be mainly used to transmit and receive user layer data. Also, UM DRB means a DRB using the RLC layer operating in an Unacknowledged Mode (UM), and AM DRB means a DRB using the RLC layer operating in an Acknowledged Mode (AM).

Figure 1F:
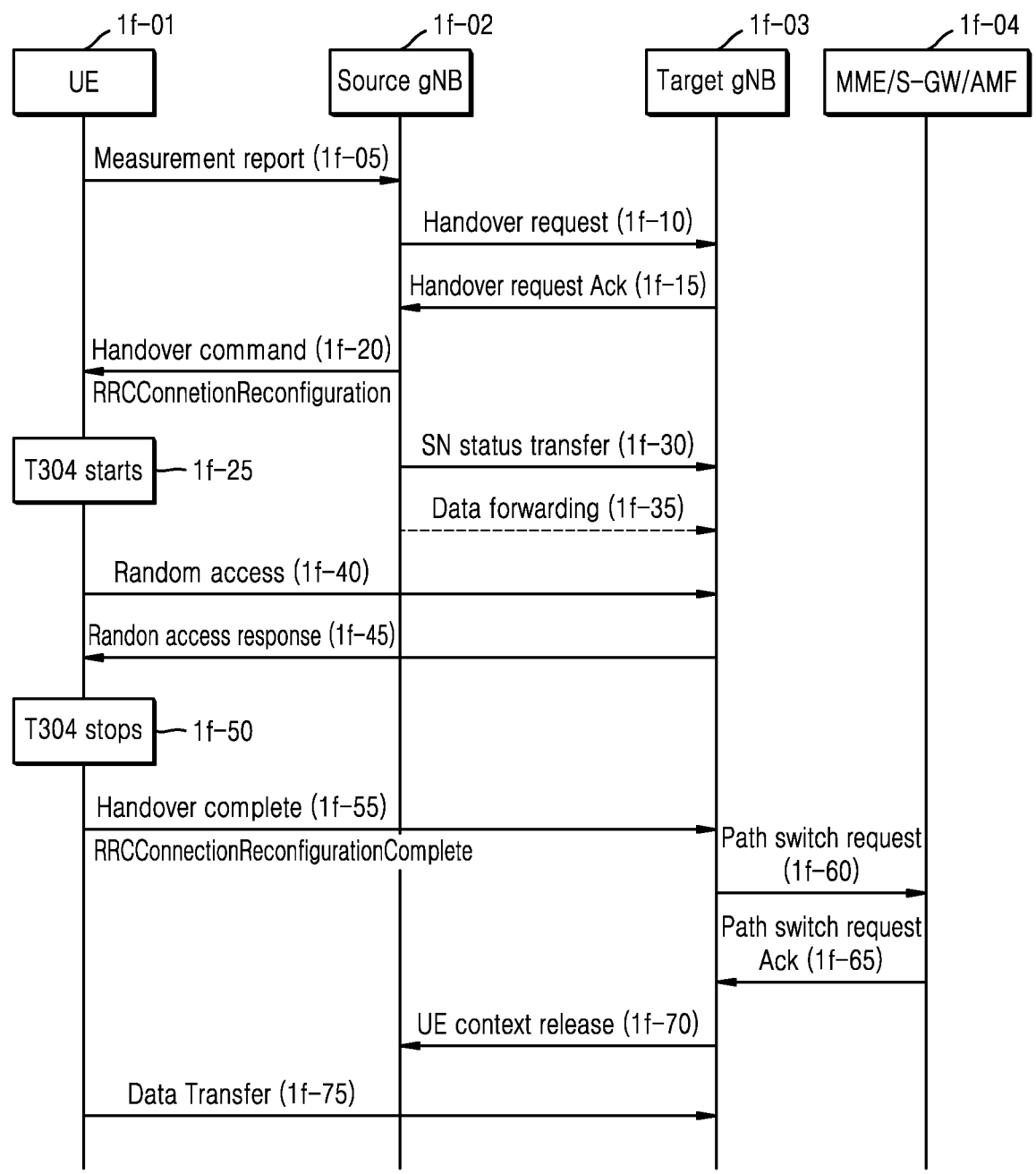
FIG. 1F shows a handover procedure in a next-generation mobile communication system according to an embodiment of the disclosure.

FIG. 1F shows a handover procedure in a next-generation mobile communication system according to an embodiment of the disclosure.

Referring to FIG. 1F, a UE 1f-01 which is in the RRC connected mode may send a cell measurement report to a source gNB 1f-02 periodically or when a preset event is satisfied, in operation 1f-05. The source gNB 1f-02 may determine whether to perform a handover of the UE 1f-01 to an adjacent cell based on the cell measurement information. The handover may be a technique of changing a source gNB providing a service to a UE being in a connected mode to another gNB (or another cell in the same gNB).

When the source gNB 1f-02 determines a handover, the source gNB 1f-02 may send a handover (HO) request message to a new gNB, that is, a target gNB 1f-03 that is to provide a service to the UE 1f-01, thereby requesting a handover, in operation 1f-10. When the target gNB 1f-03 accepts the handover request, the target gNB 1f-03 may transmit a HO request Ack message to the source gNB 1f-02, in operation 1f-15. When the source gNB 1f-02 receives the HO request Ack message, the source gNB 1f-02 may transmit a HO command message to the UE 1f-01, in operation 1f-20. The source gNB 1f-02 may transfer the HO command message to the UE 1f-01 by using an RRC Connection Reconfiguration message, in operation 1f-20. When the UE 1f-01 receives the HO command message, the UE 1f-01 may stop data transmission/reception to/from the source gNB 1f-02, and start a T304 timer, in operation 1f-25. The T304 timer may return the UE 1f-01 to its original setting and change the UE 1f-01 to an RRC idle state, when the UE 1f-01 fails to perform a handover to the target gNB 1f--03 within a preset time period. The source gNB 1f-02 may transfer a sequence number (SN) status about a transmission/reception status of uplink or downlink data to the target gNB 1f-03, and when there is downlink data, the source gNB 1f-02 may transfer the downlink data to the target gNB 1f-03, in operations 1f-30 and 1f-35. The UE 1f-01 may attempt a random access to a target cell indicated from the source gNB 1f-02, in operation 1f-40. The random access may be aimed to notify the target cell that the UE 1f-01 moves through a handover, while synchronizing an uplink. For the random access, the UE 1f-01 may transmit a preamble corresponding to a preamble ID received from the source gNB 1f-02 or a randomly selected preamble ID to the target cell. When a preset number of subframes elapse after the preamble is transmitted, the UE 1f-01 may monitor whether a Random Access Response (RAR) message is transmitted from the target cell. A time period in which the UE 1f-01 monitors whether the RAR message is transmitted is referred to as a RAR window. When a RAR message is received within the time period of the monitoring in operation 1f-45, the UE 1f-01 may transmit a HO complete message as an RRC Reconfiguration Complete message to the target gNB 1f-03, in operation 1f-55. When a random access response is successfully received from the target gNB 1f-03, the UE 1f-01 may stop the T304 timer, in operation 1f-50.

To correct paths of bearers set to the source gNB 1f-02, the target gNB 1f-03 may request a core network 1f-04 to correct paths in operations 1f-60 and 1f-65, and notify the source gNB 1f-02 of discarding UE context of the UE 1f-01, in operation 1f-70. Accordingly, the UE 1f-01 may attempt to receive data with respect to the target gNB 1f-03 from when the RAR window starts, and after the RAR message is received, the UE 1f-01 may transmit the RRCConnectionReconfigurationComplete message to the target gNB 1f-03 and start data transmission/reception to/from the target gNB 1f-30. Then, when the source gNB 1f-02 receives an endmarker indicating final data from the core network 1f-04, the source gNB 1f-02 may determine that a path of downlink data for the UE 1f-01 has changed to the target gNB 1f-03, and perform forwarding of the final data to the target gNB 1f-30. According to an embodiment of the disclosure, the core network 1f-04 may include at least one of a MME, a S-GW, or an AMF, and further include at least one of a UPF or a SMF.

In the above-described handover procedure, when the source gNB 1f-02 transmits the HO command message (for example, an RRC Reconfiguration message) to the UE 1f-01, at least one of information about a target gNB to which the UE 1f-01 needs to perform a handover, information about a random access transmission resource for a cell, preamble information, bearer configuration information, or cell information may be set in the HO command message.

Also, the HO command message may include an indicator defined to indicate what kind of handover the UE 1f-01 needs to perform. For example, the source gNB 1f-02 may define indicators for a plurality of handover methods, and set one of the defined indicators such that the UE 1f-01 perform a handover method corresponding to the set indicator. The plurality of handover methods may include at least one method of a RACH-less handover method, a make before break (MBB) handover method, an enhanced make before break (eMBB) method, or a conditional handover method. Also, the HO command message may include an indicator indicating whether or not the UE 1f-01 generates a PDCP status report for each bearer (UM DRB or AM DRB) or the PDCP layer and transmits the PDCP status report to the source gNB 1f-02 or the target gNB 1f-03.

Figure 1G:
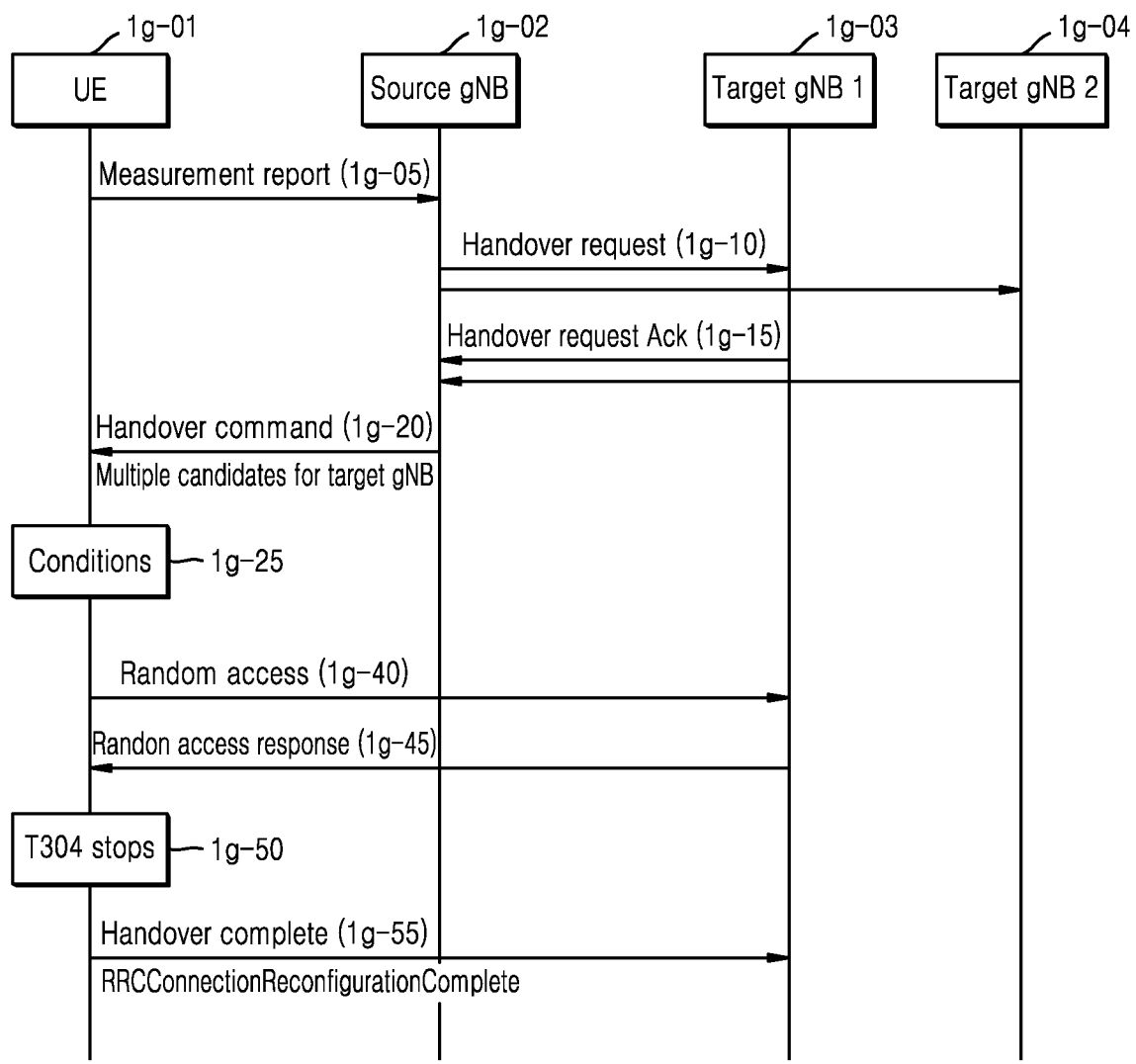
FIG. 1G shows a conditional handover procedure according to an embodiment of the disclosure.

FIG. 1G shows a conditional handover procedure according to an embodiment of the disclosure.

In FIG. 1G, a UE 1g-01 which is in the RRC connected mode may send a cell measurement report to a source gNB 1g-02 periodically or when a preset event is satisfied, in operation 1g-05. The source gNB 1g-02 may determine whether to perform a conditional handover of the UE 1g-01 to adjacent cells, based on the cell measurement information.

The conditional handover may be a technique of changing a source gNB providing a service to a UE being in a connected mode to another gNB (or another cell in the same gNB). For conditional handover a plurality of target gNB candidates and conditions for determining a target gNB may be set for a UE to enable the UE to select, as a target gNB, a target gNB candidate from among the plurality of target gNB candidates according to the set conditions and perform a handover. As the conditions for determining the target gNB, various conditions, such as a greater frequency signal intensity than a threshold value, a first synchronized signal frequency, a determination according to a UE's implementation without any condition, etc. may be set.

When the source gNB 1g-02 determines performing of a conditional handover, the source gNB 1g-02 may send HO request messages to a plurality of target gNB candidates including a plurality of new gNBs that are to provide a service to the UE 1g-01, that is, a plurality of target gNBs Target gNB 1 1g-03 and Target gNB 2 1g-04, thereby requesting a handover, in operation 1g-10. When the plurality of target gNBs 1g-03 and 1g-04 accept the handover request, the plurality of target gNBs 1g-03 and 1g-04 may transmit HO request Ack messages to the source gNB 1g-02, in operation 1g-15. When the source gNB 1g-02 receives the HO request Ack messages, the source gNB 1g-02 may transmit a HO command message to the UE 1g-01, in operation 1g-20. The source gNB 1g-02 may transfer the HO command message to the UE 1g-01 by using an RRC Connection Reconfiguration message, in operation 1g-20.

In the above-described handover procedure, when the source gNB 1g-02 transmits the HO command message (for example, an RRC Reconfiguration message) to the UE 1g-01, at least one of information about the plurality of target gNBs 1g-03 and 1g-04 to which the UE 1g-01 needs to perform a handover, information about a random access transmission resource for a cell, preamble information, bearer configuration information, or cell information may be set in the HO command message.

Also, the HO command message may include an indicator defined to indicate what kind of handover the UE 1g-01 needs to perform. For example, the source gNB 1g-02 may define indicators for a plurality of handover methods, and set one of the defined indicators such that the UE 1g-01 performs a handover method corresponding to the set indicator. The plurality of handover methods may include at least one method of a RACH-less handover method, a MBB handover method, an eMBB method, or a conditional handover method. Also, the HO command message may include an indicator indicating whether or not the UE 1g-01 generates a PDCP status report for each bearer (UM DRB or AM DRB) or the PDCP layer and transmits the PDCP status report to the source gNB 1g-02 or the target gNB.

When the source gNB 1g-02 indicates a conditional handover, the HO command message may include a condition for enabling the UE 1g-01 to select a target gNB from among the plurality of target gNBs 1g-03 and 1g-04. As the condition for enabling the UE 1g-01 to select the target gNB, various conditions, such as a greater frequency signal intensity than a threshold value, a first synchronized signal frequency, a determination according to implementation of the UE 1g-01 without any condition, etc. may be set.

When the UE 1g-01 receives the HO command message, the UE 1g-01 may start a T304 timer and perform a conditional handover procedure. More specifically, the UE 1g-01 may start a cell re-selection procedure or a cell search procedure for the plurality of target gNBs 1g-03 and 1g-04 or a plurality of frequencies according to the condition included in the HO command message or the implementation of the UE 1g-01, in operation 1g-25.

Then, when the UE 1g-01 determines a target gNB (for example, the target gNB 1g-03) or a cell that is suitable for the condition or the implementation of the UE 1g-01, the UE 1g-01 may attempt a random access to the determined target gNB 1g-03 or the determined cell (also, referred to as a target cell, in operation 1g-40. The random access may be aimed to inform the target cell that the UE 1g-01 moves through a handover, while synchronizing an uplink. For the random access, the UE 1g-01 may transmit a preamble corresponding to a preamble ID received from the source gNB 1g-02 or a randomly selected preamble ID to the target cell. When a preset number of subframes elapse after the preamble is transmitted, the UE 1g-01 may monitor whether a RAR message is transmitted from the target cell. A time period in which the UE 1g-01 monitors whether the RAR message is transmitted is referred to as a RAR window. When the RAR message is received within the time period of the monitoring in operation 1g-45, the UE 1g-01 may transmit a HO complete message as an RRCConnectionReconfigurationComplete message to the target gNB 1g-03, in operation 1g-55. When a random access response is successfully received from the target gNB 1g-03, the UE 1g-01 may stop the T304 timer, in operation 1g-50.

To correct paths of bearers set to the source gNB 1g-02, the target gNB 1g-03 may request route correction, and notify the source gNB 1g-02 of discarding UE context of the UE 1g-01. Accordingly, the UE 1g-01 may attempt to receive data with respect to the target gNB 1g-03 from when the RAR window starts, and after the RAR message is received, the UE 1g-01 may transmit the RRCConnectionReconfigurationComplete message to the target gNB 1g-03 and start data transmission/reception to/from the target gNB 1g-30.

In the conditional handover method according to an embodiment of the disclosure as described above with reference to FIG. 1G, a time at which the UE 1g-01 releases a connection to the source gNB 1g-02 may be determined by the UE 1g-01 based on a first condition described below. The first condition is that when at least one condition among a plurality of conditions described below is satisfied, the UE 1g-01 may release a connection to the source gNB 1g-02.

When a UE performs a procedure of a random access to a target gNB and receives a random access response from the target gNB When a UE performs a procedure of a random access to a target gNB, receives a random access response from the target gNB, configures a handover complete message, and transmits the handover complete message to the target gNB When a UE completes a procedure of a random access to a target gNB and is first assigned a PUCCH or PUSCH uplink transmission resource or when a UE first transmits data in a PUCCH or PUSCH uplink transmission resource When a gNB sets a separate timer through an RRC message for a UE and the timer is expired The timer may start at at least one time of a time at which the UE receives a handover command message from a source gNB, a time at which the UE starts a random access to the target gNB (a time at which the UE transmits a preamble to the target gNB), a time at which the UE receives a random access response from the target gNB, a time at which the UE transmits a handover complete message to the target gNB, or a time at which the UE first transmits data in a PUCCH or PUSCH uplink transmission resource.

When a UE performs a procedure of a random access to a target gNB, receives a random access response from the target gNB, configures a handover complete message, and transmits the handover complete message to the target gNB, and then a successful transfer of the handover complete message is acknowledged by a MAC layer (HARQ ACK) or a RLC layer (RLC ACK)

When a UE performs a procedure of a random access to a target gNB, receives a random access response from the target gNB, configures a handover complete message, transmits the handover complete message to the target gNB, and then is first assigned or indicated a uplink transmission resource from the target gNB.

The conditional handover method according to an embodiment of the disclosure as described above with reference to FIG. 1G may have two issues.

A first issue of the issues is that the source gNB 1g-02 is not capable of accurately recognizing a time at which the UE 1g-01 releases a connection to the source gNB 1g-02, in the conditional handover method. The reason is because, in a conditional handover, the UE 1g-01 selects a gNB from among a plurality of target gNBs according to a preset condition and itself releases a connection to the source gNB 1g-02 according to the first condition described above. Accordingly, the source gNB 1g-02 may transmit downlink data to the UE 1g-01 even after the UE 1g-01 releases a connection to the source gNB 1g-02. Therefore, massive downlink data loss may occur.

A second issue of the issues is that, in a conditional handover, the source gNB 1g-02 transmits a handover command message including conditions and configuration information about a plurality of target gNBs to the UE 1g-01 so that the source gNB 1g-02 is not capable of expecting a target gNB to which the UE 1g-01 will perform a handover.

In the handover procedure described above with reference to FIG. 1F, because the source gNB 1f-02 transmits a handover command message including information about the single target gNB 1f-03 to the UE 1f-01, the source gNB 1f-02 may expect that the UE 1f-01 will perform a handover to the target gNB 1f-03. Accordingly, referring to FIG. 1F, the source gNB 1g-02 may transmit a handover command message to the UE 1g-01, and then immediately start transmitting uplink or downlink data to the target gNB 1f-03 together with a transmission/reception status or a SN status of the uplink or downlink data.

However, in the conditional handover shown in FIG. 1G, although the UE 1g-01 completes a handover to the target gNB 1g-03 among the plurality of target gNBs 1g-03 and 1g-04, the source gNB 1g-02 may be not capable of recognizing the target gNB 1g-03 to which the UE 1g-01 performs a handover until the target gNB 1g-03 indicates the source gNB 1g-02 of a successful handover of the UE 1g-01. Accordingly, the source gNB 1g-02 may start late performing a procedure of transmitting uplink or downlink data to the target gNB 1f-03 together with a transmission/reception status or a SN status of the uplink or downlink data, resulting in a transmission delay.

Hereinafter, a first embodiment of a conditional handover operation for overcoming the first issue that may be occurred in a conditional handover is proposed in detail.

In a handover procedure, when the UE 1g-01 receives a handover command message and the handover command message indicates a conditional handover procedure, the following operations may be performed.

The UE 1g-01 may complete a procedure for a handover to a target gNB with respect to a UM bearer (or UM DRB) or an AM bearer (or AM DRB) to prevent downlink data from being lost in a conditional handover procedure, trigger, configure, and generate a PDCP status report for the downlink data at a PDCP layer of the UM bearer or the AM bearer, and transmit the PDCP status report to the target gNB when transmitting uplink data (for example, a handover complete message 1g-55 or uplink data) to the target gNB.

When a handover command message is received, the PDCP layer may trigger a PDCP re-establishment procedure, discard previously generated data (for example, old PDCP PDU), newly apply header compression, integrity protection, or a ciphering procedure, with a new security key, to data (for example, PDCP SDU) not yet transmitted among uplink data to generate data (for example, PDCP PDU), and transmit the generated data to the target gNB after a handover to the target gNB is completed.

When the handover command message includes a PDCP status report indicator, the UE 1g-01 may trigger and configure a PDCP status report for the corresponding bearer at the PDCP layer and transmit the PDCP status report. According to another method, when a PDCP status report indicator is set, the UE 1g-01 may trigger and configure a PDCP status report at the PDCP layer and transmit the PDCP status report, in the case that a conditional handover is indicated. According to another method, when a PDCP status report indicator is set, the UE 1g-01 may trigger and configure a PDCP status report at the PDCP layer and transmit the PDCP status report to the target gNB, in the case that a handover is indicated. According to another method, when a PDCP status report indicator is set, the UE 1g-01 may trigger and configure a PDCP status report at the PDCP layer and transmit the PDCP status report to the source gNB 1g-02, in the case that a handover is indicated. A time at which the PDCP layer triggers a PDCP status report when a PDCP status report indicator is set may be one of times included in the first condition described above, when a connection to the source gNB 1g-02 is released, or when a handover to the target gNB is successfully performed.

When the target gNB receives a PDCP status report for downlink data with respect to the UM bearer or the AM bearer from the UE 1g-01, the target gNB may retransmit data for which a PDCP discard timer has not yet been expired with respect to the UM bearer (or in consideration of a transmission time) or data of which successive reception has not been confirmed, to the UE 1g-01 through a downlink, based on the PDCP status report, thereby reducing data loss.

Also, for example, the target gNB may discard data (for example, PDCP PDU or PDCP SDU) of which successful transfer has been confirmed from the PDCP status report with respect to the AM bearer, and selectively retransmit data (for example, PDCP PDU or PDCP SDU) of which successful transfer has not been confirmed, thereby reducing data loss.

Also, the UE 1g-01 may not perform data retransmission until receiving a PDCP status report for uplink data from the target gNB after completing a conditional handover, to prevent unnecessary waste of transmission resources, that is, to prevent waste of transmission resources that are caused by accumulative retransmission in a PDCP re-establishment procedure of the UE 1g-01. Although the UE 1g-01 does not perform data retransmission until receiving a PDCP status report, the UE 1g-01 may newly apply header compression, integrity protection, or a ciphering procedure to data not yet transmitted, with a new security key, to generate data (for example, PDCP PDU) and transmit the data to the target gNB. Also, after the UE 1g-01 receives a PDCP status report for uplink data from the target gNB, the UE 1g-01 may newly apply header compression, integrity protection, or a ciphering procedure to data (for example, PDCP SDU) of which successful transfer has not been confirmed from the PDCP status report, with a new security key, to generate data (for example, PDCP PDU), and transmit the data to the target gNB after a handover to the target gNB is completed. According to another method, the target gNB may not assign uplink transmission resource to the UE 1g-01 until a PDCP status report for uplink data is configured and transmitted.

Hereinafter, a second embodiment of a conditional handover operation for overcoming the first issue that may be generated in a conditional handover is proposed in detail.

The first issue of the conditional handover method proposed in an embodiment of the disclosure is that the source gNB 1g-02 is not capable of accurately recognizing a time at which the UE 1g-01 releases a connection to the source gNB 1g-02. The reason is because, in a conditional handover, the UE 1g-01 selects a target gNB from among the plurality of target gNBs 1g-03 and 1g-04 according to a preset condition and itself releases a connection to the source gNB 1g-02 according to the first condition described above. Accordingly, according to the second embodiment of the disclosure, when the UE 1g-01 releases a connection to the source gNB 1g-02 according to the first condition described above, the UE 1g-01 may indicate the source gNB 1g-02 of a connection release. Detailed operations of the second embodiment may be as follows.

When the UE 1g-01 receives a handover command message in a handover procedure and the handover command message indicates a conditional handover procedure, the following operations may be performed.

When the UE 1g-01 releases a connection to the source gNB 1g-02 according to the first condition, the UE 1g-01 may transmit an indication indicating that a connection to the source gNB 1g-02 has been released to the source gNB 1g-02.

The indication indicating that the connection to the source gNB 1g-02 has been released may be transmitted when the UE 1g-01 transmits a new RRC message to the source gNB 1g-02 or defines a new indicator in an existing RRC message and transmits the resultant RRC message to the source gNB 1g-02 or when the UE 1g-01 defines a new MAC CE, a new RLC control PDU, or a new PDCP control PDU and transmits the new MAC CE, the new RLC control PDU, or the new PDCP control PDU to the source gNB 1g-02.

In the case of the new MAC CE, when the UE 1g-01 releases a connection to the source gNB 1g-02, the UE 1g-01 may configure the new MAC CE and transmit the new MAC CE to the source gNB 1g-02 to indicate a connection release from the source gNB 1g-02 and confirm whether HARQ ACK/NACK of MAC PDU included in the MAC CE is successfully transferred. When the UE 1g-01 defines a new RLC control PDU or a new PDCP control PDU and indicates a connection release from the source gNB 1g-02 by using the new RLC control PDU or the new PDCP control PDU, the UE 1g-1 may transmit a RLC control PDU or a PDCP control PDU newly defined for each bearer. The newly defined RRC message, the newly defined indicator of the RRC message, the newly defined MAC CE, the newly defined RLC control PDU, or the newly defined PDCP control PDU may include an indicator indicating a target gNB to which the UE 1g-01 performs, attempts, or completes a handover among the plurality of target gNB candidates in the conditional handover method. The indicator indicating the target gNB may be at least one of an identifier of the target gNB, a bitmap of the target gNB, or an indicator indicating a certain target of the plurality of target gNB candidates.

According to another method, when the UE 1g-01 releases a connection to the source gNB 1g-02 according to the first condition described above, the UE 1g-01 may transmit a PDCP status report to the source gNB 1g-02 for each bearer (UM bearer or AM bearer), wherein a 1-bit indicator indicating a connection release may be defined and used in the PDCP status report. When the source gNB 1g-02 receives a PDCP status report for each bearer from the UE 1g-01 after indicating a conditional handover, the source gNB 1g-02 may consider that the PDCP status report itself indicates a connection release of the UE 1g-01 from the source gNB 1g-02 and has been finally transmitted from the UE 1g-01. For example, when the source gNB 1g-02 receives a PDCP status report for all DRBs from the UE 1g-01, receives a PDCP status report for all AM DRBs from the UE 1g-01, or receives a PDCP status report from at least one bearer after indicating the UE 1g-01 to perform a conditional handover, the source gNB 1g-02 may consider that the UE 1g-01 has released a connection to the source gNB 1g-02.

Therefore, according to the second embodiment described above, when the source gNB 1g-02 confirms that the UE 1g-01 has released a connection to the source gNB 1g-02, the source gNB 1g-02 may be prevented from transmitting unnecessary downlink data to the UE 1g-01 to avoid data loss, may prepare downlink/uplink data which the UE 1g-01 is to transfer with a target gNB to which the UE 1g-01 has completed a handover or a SN status of the downlink/uplink data, and may start transmitting the SN status or the downlink/uplink data.

The newly defined RRC message, the newly defined indicator of the RRC message, the newly defined MAC CE, the newly defined RLC control PDU, or the newly defined PDCP control PDU may include an indicator indicating a target gNB to which the UE 1g-01 performs, attempts, or completes a handover among the plurality of target gNB candidates in the conditional handover method when a connection release from the source gNB 1g-02 is indicated. The indicator indicating the target gNB may be at least one of an identifier of the target gNB, a bitmap of the target gNB, or an indicator indicating a certain target of the plurality of target gNB candidates. Accordingly, when the source gNB 1g-02 receives an indicator indicating a target gNB from the UE 1g-01, the source gNB 1g-02 may immediately prepare downlink/uplink data that is to be transferred to the target gNB or a SN status of the downlink/uplink data, and start transmitting the SN status or the downlink/uplink data to the target gNB, thereby reducing a transmission delay. Therefore, according to the second embodiment, the second issue of the conditional handover method may be overcome.

Hereinafter, a third embodiment of a conditional handover operation for overcoming the second issue that may be generated in a conditional handover is proposed in detail.

The second issue is that, in a conditional handover, the source gNB 1g-02 transmits a handover command message including conditions and configuration information about a plurality of target gNBs to the UE 1g-01 so that the source gNB 1g-02 is not capable of expecting a target gNB to which the UE 1g-01 will perform a handover. However, in the conditional handover, although the UE 1g-01 completes a handover to a target gNB among the plurality of target gNB candidates, the source gNB 1g-02 may be not capable of recognizing the target gNB to which the UE 1g-01 performs a handover until the target gNB indicates the source gNB 1g-02 of a successful handover of the UE 1g-01. Accordingly, the source gNB 1g-02 may start late a procedure of transferring uplink or downlink data to the target gNB together with a transmission/reception status or a SN status of the uplink or downlink data, resulting in a transmission delay.

The third embodiment of the conditional handover operation for overcoming the second issue that may be generated in the conditional handover according to an embodiment of the disclosure is as follows.

In FIG. 1G, when the UE 1g-01 indicates a connection release from the source gNB 1g-02 as described above in the second embodiment as soon as the source gNB 1g-02 transmits a handover command message to the UE 1g-01 in operation 1g-20 or after the source gNB 1g-02 transmits a handover command message to the UE 1g-01, the source gNB 1g-02 may start transferring uplink or downlink data and a SN (PDCP SN) status report for the uplink or downlink data in duplicate to the plurality of target gNB candidates. That is, in the third embodiment, the source gNB 1g-02 may transfer uplink or downlink data and a SN status in duplicate to the plurality of target gNB s.

In the third embodiment, when a target gNB candidate of the plurality of target gNB candidates confirms that the UE 1g-01 has performed a handover to itself, the target gNB candidate may check lost data and retransmit the lost data without any transmission delay by using the SN status and uplink and downlink data transferred from the source gNB 1g-02 to reduce data loss, and perform data transmission/reception to/from the UE 1g-01.

Also, the remaining target gNB candidates to which the UE 1g-01 has never performed a handover among the plurality of target gNB candidates may discard the SN status and uplink or downlink data transferred from the source gNB 1g-02. For example, after the plurality of target gNB candidates transmit a message indicating allowance of a handover to the source gNB 1g-02 or when the plurality of target gNB candidates receive a SN status and uplink or downlink data from the source gNB 1g-02, the target gNB candidates may start a timer. When the target gNB candidates determine that the UE 1g-01 attempts no access for a handover to the target gNB candidates until the timer is expired, the target gNB candidates may determine that the UE 1g-01 has performed a procedure of a handover to another target gNB candidate, and discard the SN status and uplink or downlink data transferred from the source gNB 1g-02. According to another method, a target gNB to which the UE 1g-01 has completed a handover may indicate the source gNB 1g-02 that the UE 1g-01 has completed a handover, and the source gNB 1g-02 may indicate the remaining target gNB candidates to which the UE 1g-01 has not performed a handover to discard the SN status and uplink or downlink data transferred from the source gNB 1g-02.

Hereinafter, a fourth embodiment of a conditional handover operation for overcoming the second issue that may be generated in the conditional handover according to an embodiment of the disclosure is as follows.

In FIG. 1G, the source gNB 1g-02 may indicate that the UE 1g-01 releases a connection to the source gNB 1g-02 as in the second embodiment described above as soon as the source gNB 1g-02 transmits a handover command message to the UE 1g-01 in operation 1g-20 or after the source gNB 1g-02 transmits a handover command message to the UE 1g-01. And the UE 1g-01 may indicate the source gNB 1g-02 of a target gNB to which the UE 1G-01 performs or completes a handover as in the second embodiment described above. Then the source gNB 1g-02 may start transferring uplink or downlink data and a SN (PDCP SN) status report about the uplink or downlink data to the target gNB indicated in the second embodiment or the target gNB to which the UE 1g-01 performs the handover.

In the fourth embodiment, the source gNB 1g-02 may transmit the uplink or downlink data and the SN status to the target gNB, based on the indication about the connection release of the UE 1g-01 from the source gNB 1g-02, received from the UE 1g-01 and the indication about the target gNB to which the UE 1g-01 performs the handover, by using the second embodiment described above. Accordingly, the target gNB may check lost data and retransmit the lost data without any transmission delay by using the SN status and uplink and downlink data to reduce data loss, and perform data transmission/reception to/from the UE 1g-01.

The UE 1g-01 may perform at least one of the first embodiment, the second embodiment, the third embodiment, or the fourth embodiment of the efficient conditional handover methods proposed in the disclosure, when performing a conditional handover. For example, the UE 1g-01 may perform all of the first to fourth embodiments or some of the above-described embodiments together.

Figure 1H:
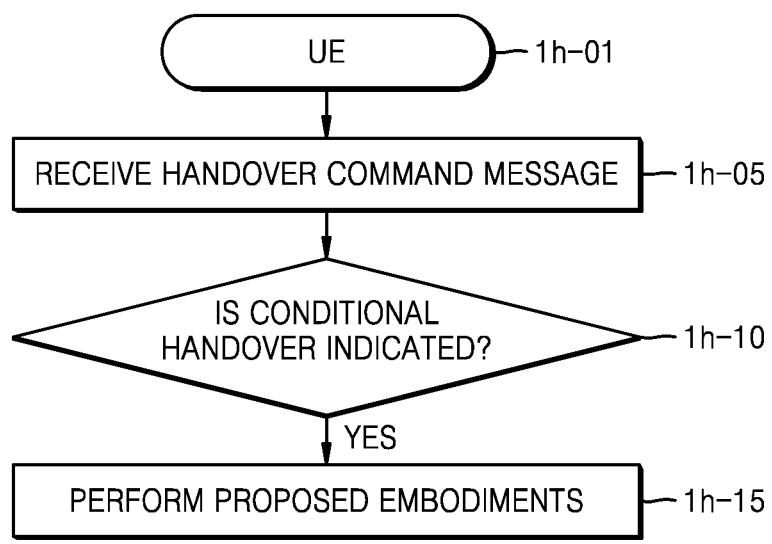
FIG. 1H shows operations of a conditional handover procedure of a UE according to an embodiment of the disclosure.

FIG. 1H shows operations of a conditional handover procedure of a UE according to an embodiment of the disclosure.

Referring to FIG. 1H, a UE 1h-01 may receive a handover command message from a source gNB, in operation 1h-05. The UE 1h-01 may check an indicator indicating a conditional handover from the handover command message, and determine whether a conditional handover is indicated, in operation 1h-10. When the handover command message indicates a conditional handover method, the UE 1h-01 may perform a conditional handover method according to an embodiment of the disclosure, in operation 1h-15. For example, the UE 1h-01 may perform at least one of the first embodiment, the second embodiment, the third embodiment, or the fourth embodiment. The UE 1h-01 may perform all of the first to fourth embodiments or some of the above-described embodiments together.

Figure 1I:
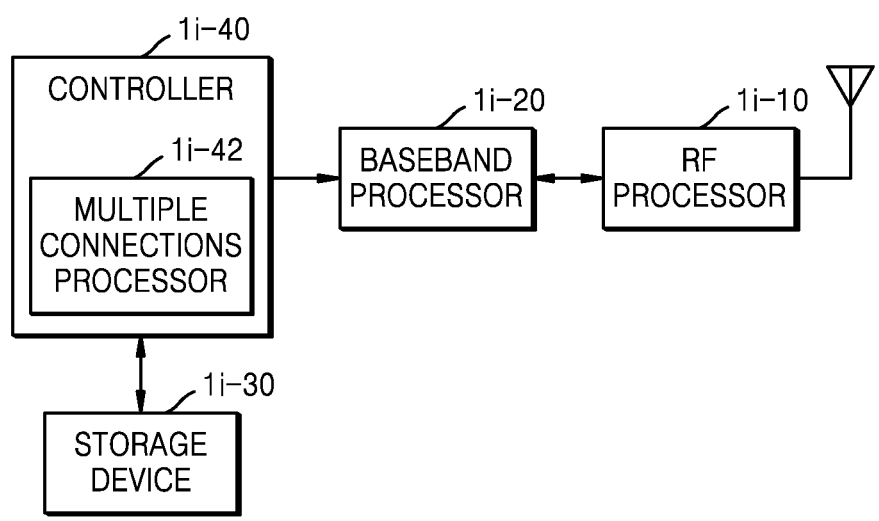
FIG. 1I shows a structure of a UE or a wireless node according to an embodiment of the disclosure.

FIG. 1I shows a structure of a UE or a wireless node according to an embodiment of the disclosure.

Referring to FIG. 1I, the UE may include a Radio Frequency (RF) processor 1i-10, a baseband processor 1i-20, a storage device 1i-30, and a controller 1i-40. However, an internal structure of the UE is not limited to the embodiment shown in FIG. 1I, and the UE may include more or less components than those shown in FIG. 1I. The RF processor 1i-10 may perform a function for transmitting and receiving signals through a wireless channel, such as band conversion, amplification, etc. of signals. That is, the RF processor 1i-10 may up-convert a baseband signal provided from the baseband processor 1i-20 into a RF band signal, transmit the RF band signal through an antenna, and down-convert an RF band signal received through the antenna into a baseband signal. For example, the RF processor 1i-10 may include a transmission filter, a reception filter, an amplifier, a mixer, an oscillator, a digital-to-analog converter (DAC), an analog-to-digital converter (ADC), etc. In FIG. 1I, a single antenna is shown, however, the UE may include a plurality of antennas. Also, the RF processor 1i-10 may include a plurality of RF chains. Furthermore, the RF processor 1i-10 may perform beamforming. For beamforming, the RF processor 1i-10 may adjust phases and magnitudes of signals that are transmitted/received through the plurality of antennas or antenna elements. Also, the RF processor 1i-10 may perform MIMO, and when MIMO is performed, the RF processor 1i-10 may receive several layers. The RF processor 1i-10 may perform sweeping of a received beam by appropriately setting the plurality of antennas or antenna elements according to a control of the controller 1i-40, or may adjust a direction and width of a received beam such that the received beam is coordinated with a beam that is to be transmitted.

The baseband processor 1i-20 may perform a function of conversion between baseband signals and bit streams according to a physical layer specification of a system. For example, upon data transmission, the baseband processor 1i-20 may encipher and modulate a transmission bit stream to generate complex symbols. Also, upon data reception, the baseband processor 1i-20 may demodulate and decipher a baseband signal provided from the RF processor 1i-10 to restore a reception bit stream. For example, according to an OFDM method, upon data transmission, the baseband processor 1i-20 may encipher and modulate a transmission bit stream to generate complex symbols, map the complex symbols to subcarriers, and then construct OFDM symbols through inverse fast Fourier transform (IFFT) and cyclic prefix (CP) insertion. Also, upon data reception, the baseband processor 1i-20 may segment a baseband signal provided from the RF processor 1i-10 in units of OFDM symbols, restore signals mapped to subcarriers through fast Fourier transform (FFT), and then restore a reception bit stream through demodulation and deciphering.

The baseband processor 1i-20 and the RF processor 1i-10 may transmit and receive signals as described above. Accordingly, the baseband processor 1i-20 and the RF processor 1i-10 are also referred to as a transmitter, a receiver, a transceiver, or a communicator. Furthermore, at least one of the baseband processor 1i-20 or the RF processor 1i-10 may include a plurality of communication modules to support a plurality of different radio access technologies. Also, at least one of the baseband processor 1i-20 or the RF processor 1i-10 may include different communication modules to process signals of different frequency bands. For example, the different radio access technologies may include a LET network, a NR network, etc. Also, the different frequency bands may include a super high frequency (SHF) (e.g., 2.1 GHz and 1 GHz) band and a millimeter wave (e.g., 60 GHz) band. The UE may transmit/receive a signal to/from a gNB by using the baseband processor 1i-20 and the RF processor 1i-10, wherein the signal may include control information and data.

The storage device 1i-30 may store data, such as basic programs, application programs, and configuration information, for operations of the UE. The storage device 1i-30 may provide the stored data according to a request from the controller 1i-40. The storage device 1i-30 may be configured with a storage medium, such as read only memory (ROM), random access memory (RAM), a hard disc, compact disc ROM (CD-ROM), digital versatile disc (DVD), and the like, or a combination of such a storage media. Also, the storage device 1i-30 may be configured with a plurality of memories.

The controller 1i-40 may control overall operations of the UE. For example, the controller 1i-40 may transmit and receive signals through the baseband processor 1i-20 and the RF processor 1i-10. Also, the controller 1i-40 may write data in the storage device 1i-30 or read data from the storage device 1i-30. To write or read data, the controller 1i-40 may include at least one processor. For example, the controller 1i-40 may include a communication processor CP for performing control for communication, and an application processor AP for controlling an upper layer of an application program, etc. Also, the controller 1i-40 may include multiple connection processor 1i-42 for processing multiple connections. Also, the controller 1i-40 may control the UE to perform a method for performing the handover procedure described above. Also, at least one component of the UE may be implemented as a single chip.

Figure 1J:
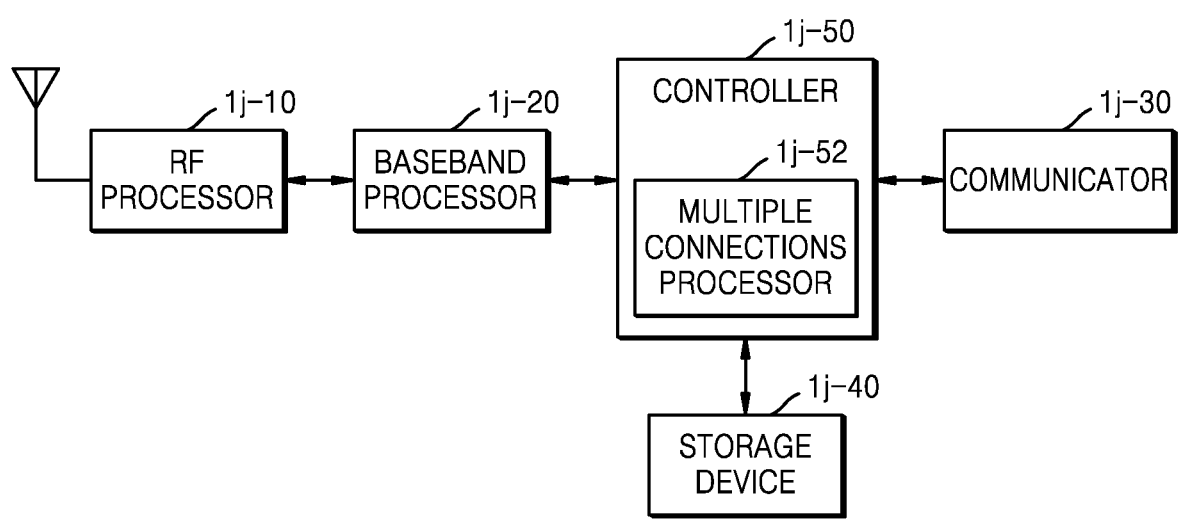
FIG. 1J shows a block configuration of a Transmission/Reception Point (TRP) or a wireless node in a wireless communication system according to an embodiment of the disclosure.

FIG. 1J shows a block configuration of a Transmission/Reception Point (TRP) or a wireless node in a wireless communication system according to an embodiment of the disclosure.

Referring to FIG. 1J, a gNB (also, referred to as a TRP or a wireless node) may include a RF processor 1j-10, a baseband processor 1j-20, a backhaul communicator 1j-30, a storage device 1j-40, and a controller 1j-50. However, a configuration of the gNB is not limited to the embodiment shown in FIG. 1J, and the gNB may include more or less components than those shown in FIG. 1J.

The RF processor 1j-10 may perform a function for transmitting and receiving signals through a wireless channel, such as band conversion, amplification, etc. of signals. That is, the RF processor 1j-10 may up-convert a baseband signal provided from the baseband processor 1j-20 into a RF band signal, transmit the RF band signal through an antenna, and down-convert an RF band signal received through the antenna into a baseband signal. For example, the RF processor 1j-10 may include a transmission filter, a reception filter, an amplifier, a mixer, an oscillator, a DAC, an ADC, etc. In FIG. 1J, a single antenna is shown, however, the gNB may include a plurality of antennas. Also, the RF processor 1j-10 may include a plurality of RF chains. Furthermore, the RF processor 1j-10 may perform beamforming. For beamforming, the RF processor 1j-10 may adjust phases and magnitudes of signals that are transmitted/received through the plurality of antennas or antenna elements. The RF processor 1j-10 may perform a downlink MIMO operation by transmitting one or more layers.

The baseband processor 1j-20 may perform a function of conversion between baseband signals and bit streams according to a physical layer specification of first radio access technology. For example, upon data transmission, the baseband processor 1j-20 may encipher and modulate a transmission bit stream to generate complex symbols. Also, upon data reception, the baseband processor 1j-20 may demodulate and decipher a baseband signal provided from the RF processor 1j-10 to restore a reception bit stream. For example, according to the OFDM method, upon data transmission, the baseband processor 1j-20 may encipher and modulate a transmission bit stream to generate complex symbols, map the complex symbols to subcarriers, and then construct OFDM symbols through IFFT and CP insertion. Also, upon data reception, the baseband processor 1j-20 may segment a baseband signal provided from the RF processor 1j-10 in units of OFDM symbols, restore signals mapped to subcarriers through FFT, and then restore a reception bit stream through demodulation and deciphering. The baseband processor 1j-20 and the RF processor 1j-10 may transmit and receive signals as described above. Accordingly, the baseband processor 1j-20 and the RF processor 1j-10 are also referred to as a transmitter, a receiver, a transceiver, a communicator, or a wireless communicator. The gNB may transmit/receive a signal to/from the UE by using the baseband processor 1j-20 and the RF processor 1j-10, wherein the signal may include control information and data.

The communicator 1j-30 may provide an interface for communicating with other nodes in a network.

The storage device 1*j*-40 may store data, such as basic programs, application programs, and configuration information, for operations of the gNB. Particularly, the storage device 1*j*-40 may store information about a bearer assigned to a UE connected to the gNB, a measurement result reported from the connected UE, etc. Also, the storage device 1*j*-40 may store information that is used as a determination criterion about whether to provide multiple connections to the UE or whether to release multiple connections to the UE. Also, the storage device 1*j*-40 may provide the stored data according to a request from the controller 1*j*-50. The storage device 1*j*-40 may be configured with a storage medium, such as ROM, RAM, a hard disc, CD-ROM, DVD, and the like, or a combination of such a storage media. Also, the storage device 1*j*-40 may be configured with a plurality of memories.

The controller 1*j*-50 may control overall operations of the gNB. For example, the controller 1*j*-50 may transmit and receive signals through the baseband processor 1*j*-20 and the RF processor 1*j*-10 or through the backhaul communicator 1*j*-30. Also, the controller 1*j*-50 may write data in the storage device 1*j*-40 or read data from the storage device 1*j*-40. To write or read data, the controller 1*i*-50 may include at least one processor. Also, the controller 1*j*-50 may include multiple connection processor 1*j*-52 for processing multiple connections. For example, the controller 1*i*-50 may control the gNB such that the UE may perform a method for performing an RRC connection resume procedure as described above. Also, at least one component of the gNB may be implemented as a single chip.

Hereinafter, according to the disclosure, an indicator may be proposed to set an in-order delivery function for reception operations of a reception RLC layer of a next-generation mobile communication system with an RRC message, and when the in-order delivery function is set in the RLC layer with the indicator, detailed reception window operations of the RLC layer are proposed for the RLC UM mode or the RLC AM mode. According to an embodiment of the disclosure, data may be transferred in order to the PDCP layer. Also, data loss that may be generated in the PDCP layer may be prevented, and also, data processing that may be generated upon a handover may be simplified.

When a UE and a gNB transmit and receive data in a next-generation mobile communication system, a reception RLC layer may always perform an out-of-order delivery function. The out-of-order delivery function means a function of reassembling data received by the reception RLC layer in arrival order, without ordering the data in order of RLC SNs, and transferring a result of the reassembling to an upper layer. The out-of-order delivery function may be effective in view of transmission delay, but may cause data loss and increase complexity of handover processing because the PDCP layer drives a timer and moves a window when the timer is expired.

Hereinafter, a method and apparatus for processing communication data will be described with reference to FIGS. 2A to 2M.

Figure 2A:
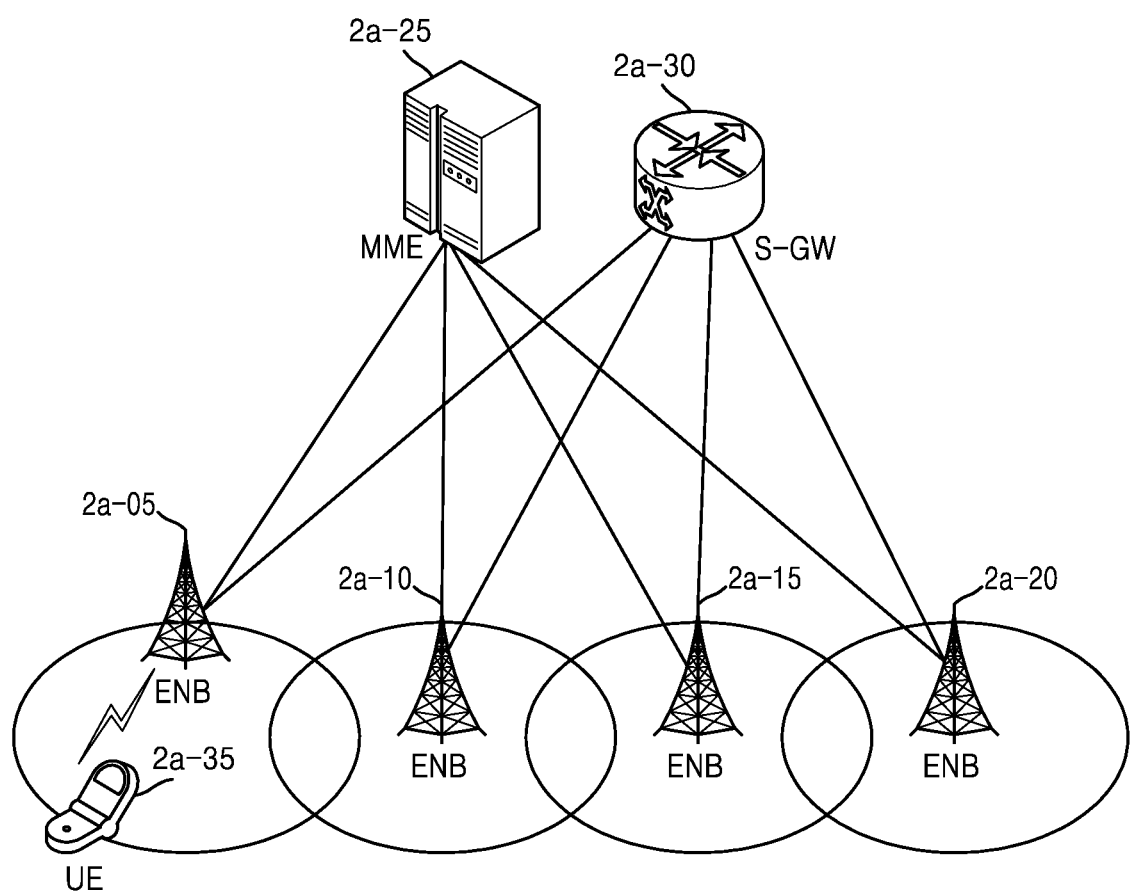
FIG. 2A shows a structure of an LTE system to which an embodiment of the disclosure may be applied.

FIG. 2A shows a structure of an LTE system to which an embodiment of the disclosure may be applied.

Referring to FIG. 2A, a radio access network of an LTE system may be configured with next-generation Evolved Node B (ENBs) (hereinafter, also referred to as Nodes B or base stations), 2*a*-05, 2*a*-10, 2*a*-15, and 2*a*-20, a MME 2*a*-25, and a S-GW 2*a*-30. A UE 2*a*-35 may be connected to an external network through the ENBs 2*a*-05 to 2*a*-20 and the S-GW 2*a*-30.

In FIG. 2A, the ENBs 2*a*-05 to 2*a*-20 may correspond to existing nodes B of a UMTS. The ENBs 2*a*-05 to 2*a*-20 may be connected to the UE 2*a*-35 through a wireless channel, and perform more complicated functions than the existing nodes B. In the LTE system, because all user traffics including a real-time service such as VoIP are serviced through a shared channel, a device for performing scheduling by collecting status information of UEs, such as buffer statuses of UEs, available transmission power states of UEs, channel states of UEs, etc., is needed. The ENBs 2*a*-05 to 2*a*-20 may function as such a device. An ENB may generally control a plurality of cells. For example, to implement a transmission speed of 100 Mbps, the LTE system uses, as radio access technology, OFDM, for example, in a bandwidth of 20 MHz. Also, AMC of determining a modulation scheme and a channel coding rate according to a channel state of a UE may be applied. The S-GW 2*a*-30, which is a device for providing data bearers, may generate or remove data bearers according to a control of the MME 2*a*-25. The MME 2*a*-25 may be in charge of various control functions, as well as a mobility management function for UEs, and may be connected to a plurality of ENBs.

Figure 2B:
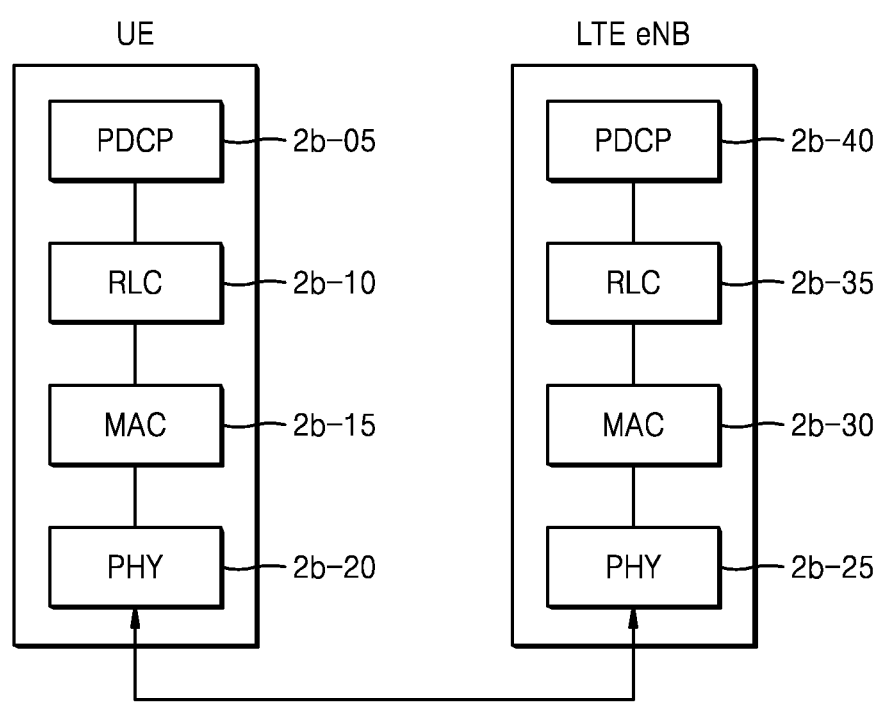
FIG. 2B shows a radio protocol architecture of an LTE system to which an embodiment of the disclosure may be applied.

FIG. 2B shows a radio protocol architecture of an LTE system to which an embodiment of the disclosure may be applied.

Referring to FIG. 2B, radio protocols of the LTE system may include PDCPs 2*b*-05 and 2*b*-40, RLC 2*b*-10 and 2*b*-35, and MAC 2*b*-15 and 2*b*-30 of a UE and an ENB. The PDCPs 2*b*-05 and 2*b*-40 may be in charge of operations of IP header compression/restoration. Main functions of the PDCPs 2*b*-05 and 2*b*-40 may be summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink
The RLC 2*b*-10 and 2*b*-35 may reconstruct a PDCP PDU to an appropriate size to perform an ARQ operation, etc. Main functions of the RLC 2*b*-10 and 2*b*-35 may be summarized as follows.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment
The MAC 2*b*-15 and 2*b*-30 may be connected to several RLC layers configured in the UE, and perform an operation of multiplexing RLC PDUs into a MAC PDU and demultiplexing RLC PDUs from a MAC PDU. Main functions of the MAC 2*b*-15 and 2*b*-30 may be summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding Physical layers (PHY) $2b$-20 and $2b$-25 may perform an operation of performing channel coding and modulation on upper layer data to generate an OFDM symbol and transmitting the OFDM symbol through a wireless channel, or demodulating an OFDM symbol received through the wireless channel, performing channel decoding on the OFDM symbol, and transferring the channel-decoded OFDM symbol to an upper layer.

Figure 2C:
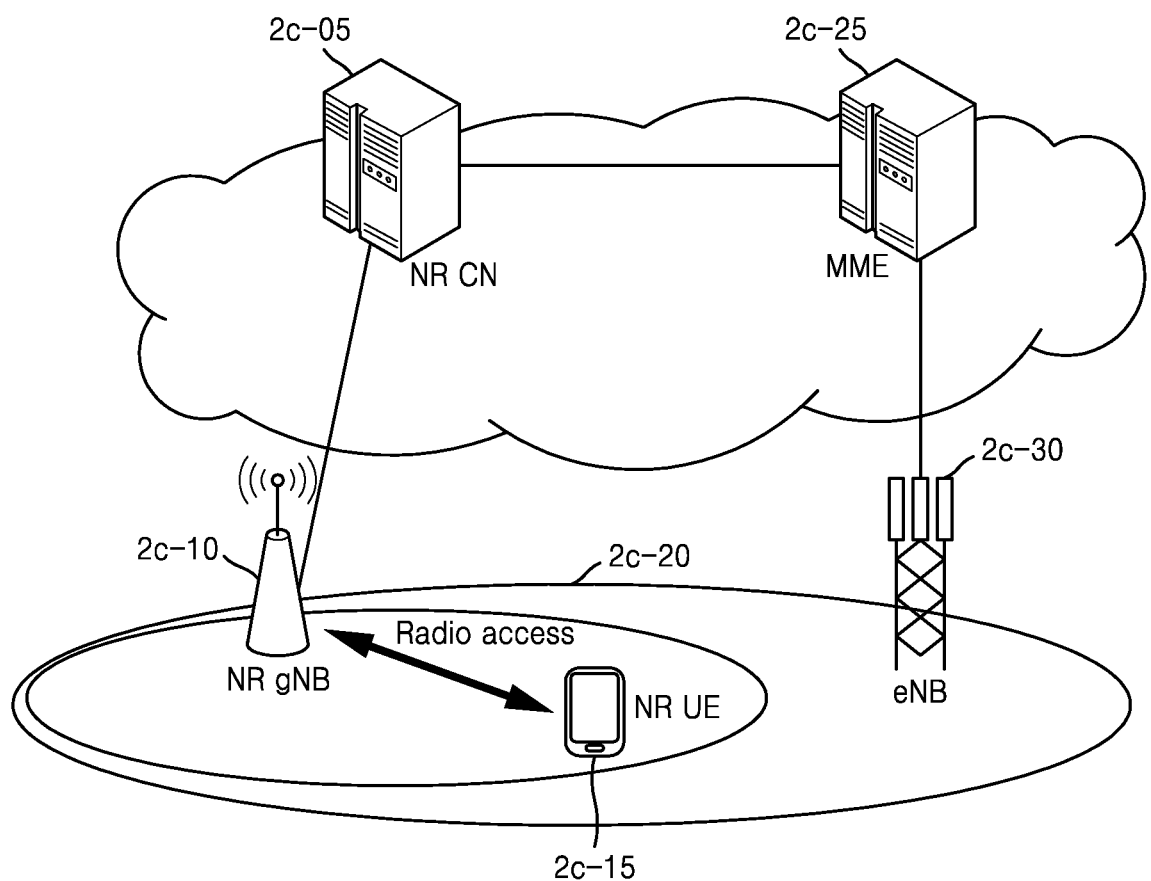
FIG. 2C shows a structure of a next-generation mobile communication system to which an embodiment of the disclosure may be applied.

FIG. 2C shows a structure of a next-generation mobile communication system to which an embodiment of the disclosure may be applied.

Referring to FIG. 2C, a radio access network of a next-generation mobile communication system (hereinafter, also referred to as NR or 5G) may be configured with a next-generation NR gNB (also, referred to as a NR base station) $2c$-10 and a NR CR $2c$-05. A NR UE (also, referred to as a UE) $2c$-15 may be connected to an external network through the NR gNB $2c$-10 and the NR CN $2c$-05.

In FIG. 2C, the NR gNB $2c$-10 may correspond to an eNB of an existing LTE system. The NR gNB $2c$-10 may be connected to the NR UE $2c$-15 through a wireless channel, and provide a more excellent service than an existing node B. In a next-generation mobile communication system, because all user traffics are serviced through a shared channel, a device for performing scheduling by collecting status information of UEs, such as buffer statuses of UEs, available transmission power states of UEs, channel states of UEs, etc., is needed. The NR gNB $2c$-10 may function as such a device. A NR gNB may generally control a plurality of cells. To implement ultra high-speed data transmission compared to existing LTE, OFDM as radio access technology may be combined with beam-forming technology, while providing an existing maximum bandwidth or more.

Also, AMC of determining a modulation scheme and a channel coding rate according to a channel state of a UE may be applied. The NR CN $2c$-05 may perform functions, such as mobility support, bearer setup, Quality of Service (QoS) setup, etc. The NR CN $2c$-05 may be in charge of various control functions, as well as a mobility management function for UEs, and may be connected to a plurality of NR gNBs. Also, the next-generation mobile communication system may interwork with an existing LTE system, and the NR CN $2c$-05 may be connected to the MME $2c$-25 through a network interface. The MME $1c$-25 may be connected to an eNB $2c$-30 which is an existing base station.

Figure 2D:
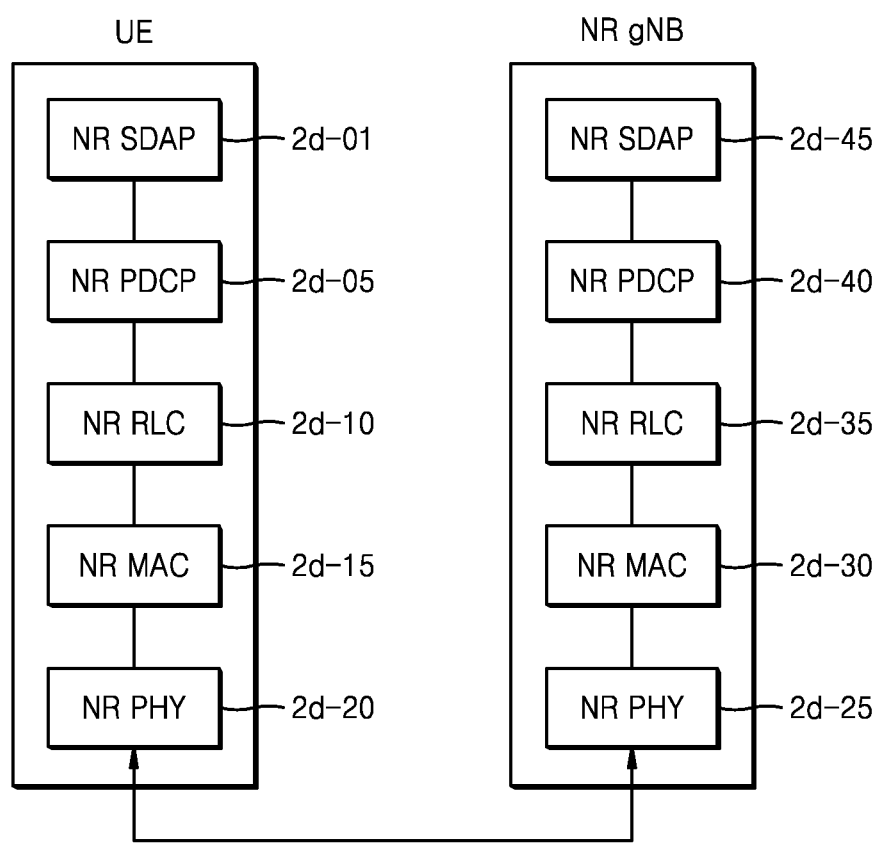
FIG. 2D shows a radio protocol architecture of a next-generation mobile communication system to which an embodiment of the disclosure may be applied.

FIG. 2D shows a radio protocol architecture of a next-generation mobile communication system to which an embodiment of the disclosure may be applied.

Referring to FIG. 2D, radio protocols of the next-generation mobile communication system may include NR SDAPs $2d$-01 and $2d$-45, NR PDCPs $2d$-05 and $2d$-40, NR RLC $2d$-10 and $2d$-35, and NR MAC $2d$-15 and $2d$-30 of an UE and a NR gNB.

Main functions of the NR SDAPs $2d$-01 and $2d$-45 may include some of the following functions.

Transfer of user plane data

Mapping between a QoS flow and a DRB for both DL and UL

Marking QoS flow ID in both DL and UL packets

Reflective QoS flow to DRB mapping for the UL SDAP PDUs

In regard of a SDAP layer as described above, the UE may receive, as an RRC message, a setting about whether to use a header of the SDAP layer or whether to use a function of the SDAP layer for each PDCP layer, for each bearer, or for each logical channel. When a SDAP header is set, the SDAP header capable of indicating the UE to update or reset mapping information about a QoS flow and a data bearer of a uplink and a downlink with a 1-bit indicator NAS reflective QoS for a NAS reflective QoS setting and a 1-bit indicator AS reflective QoS for an AS reflective QoS setting of the SDAP header may include QoS flow ID information representing QoS. QoS information may be used as data processing priority, scheduling information, etc. for supporting a stable service.

Main functions of the NR PDCPs $2d$-05 and $2d$-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

The reordering function of a NR PDCP device among the above-mentioned functions means a function of reordering PDCP PDUs received from a lower layer in order based on PDCP SNs, and may include a function of transferring data to an upper layer in the reordered order. Alternatively, the reordering function of the NR PDCP device may include a function of directly transferring data regardless of order, a function of recording lost PDCP PDUs by reordering, a function of sending a status report for lost PDCP PDUs to a transmitter, and a function of requesting retransmission of lost PDCP PDUs.

Main functions of the NR RLC $2d$-10 and $2d$-35 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of a NR RLC device among the above-mentioned functions means a function of transferring RLC SDUs received from a lower layer in order to an upper layer, and may include a function of reassembling, when a RLC SDU is segmented into several RLC SDUs and received, the RLC SDUs and transferring a result of the reassembling, a function of reordering received RLC PDUs based on RLC SNs or PDCP SNs, a function of reordering and recording lost RLC PDUs, a function of sending a status report for lost RLC PDUs to a transmitter, a function of requesting retransmission of lost RLC PDUs, a function of transferring, when there are lost RLC SDUs, RLC SDUs before the lost RLC SDUs in order to the upper layer, a function of transferring, when a preset timer has been expired although there are lost RLC SDUs, all RLC SDUs received before the preset timer starts in order to the upper layer, or a function of transferring, when the preset time has been expired although there are lost RLC SDUs, all RLC SDUs received up to now in order to the upper layer.

Also, RLC PDUs may be processed in order (in arrival order, regardless of SNs or order of SNs) in which they are received, and transferred to the PDCP device out of sequence delivery, and in the case of segments, segments which have been stored in a buffer or which are to be received later may be received and reconstructed into a compete RLC PDU and then processed and transferred to the PDCP device. A NR RLC layer as described above may include no concatenation function, and the above-described function may be performed in a NR MAC layer or replaced with a multiplexing function of the NR MAC layer.

The out-of-sequence delivery function of the NR RLC device as described above means a function of transferring RLC SDUs received from a lower layer to the upper layer regardless of order, and may include a function of reassembling, when a RLC SDU is segmented into several RLC SDUs and received, the RLC SDUs and transferring a result of the reassembling, and a function of storing and ordering RLC SNs or PDCP SNs of the received RLC PDUs and recording lost RLC PDUs.

The NR MAC 2d-15 and 2d-30 may be connected to several NR RLC layers configured in the UE, and main functions of the NR MAC 2d-15 and 2d-30 may include some of the following functions.

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding NR PHY layers 2d-20 and 2d-25 may perform an operation of performing channel coding and modulation on upper layer data to generate an OFDM symbol and transferring the OFDM symbol through a wireless channel, or performing demodulation and channel decoding on an OFDM symbol received through the wireless channel and transferring a result of the modulation and channel decoding to an upper layer.

Figure 2E:
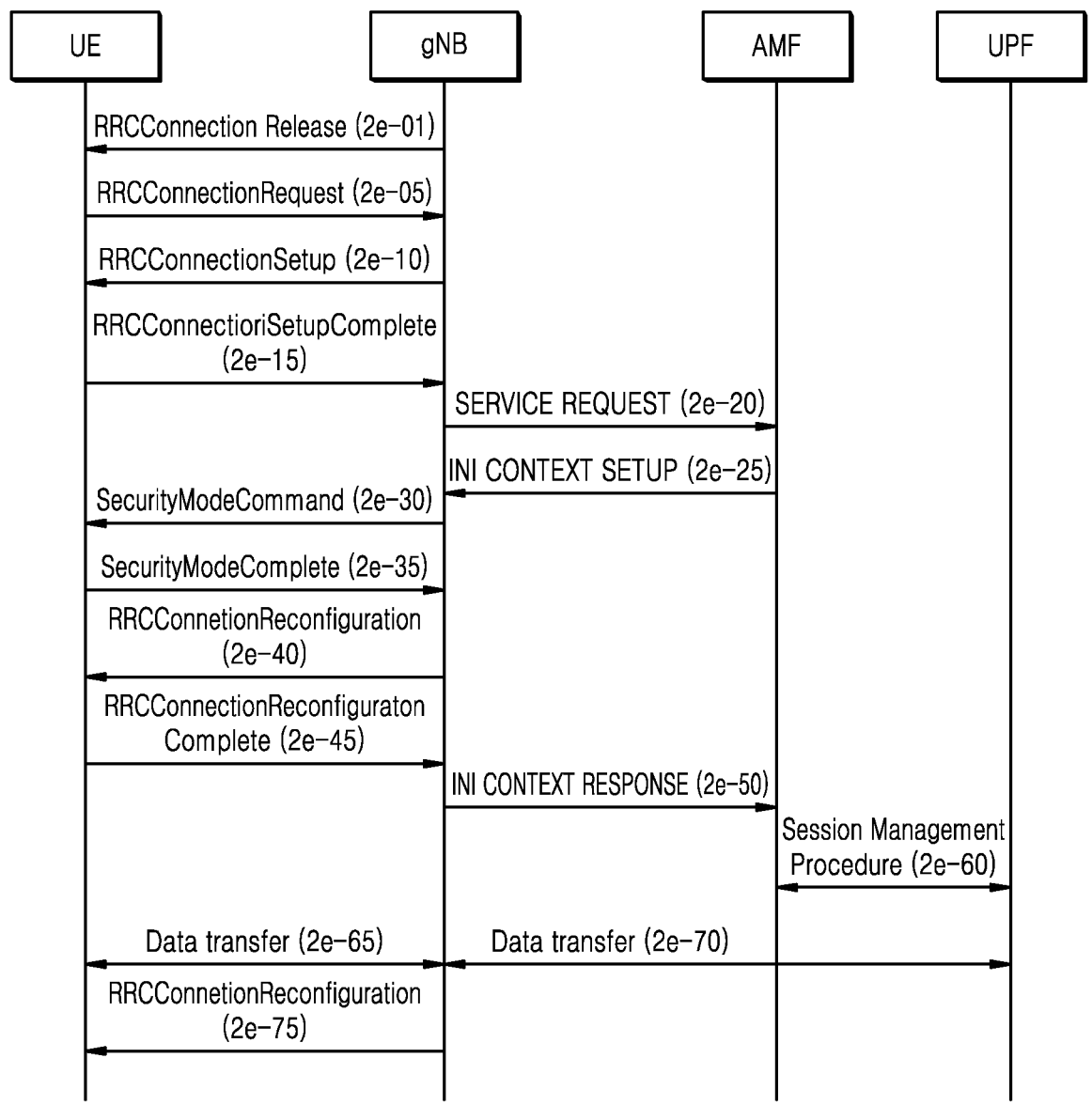
FIG. 2E is a view for describing a procedure in which a gNB according to an embodiment of the disclosure releases a connection of a UE for the UE to change from an RRC connected mode to an RRC idle mode and a procedure in which the UE sets up a connection to the gNB to change from the RRC idle mode to the RRC connected mode.

FIG. 2E is a view for describing a procedure in which a gNB according to an embodiment of the disclosure releases a connection of a UE for the UE to change from the RRC connected mode to the RRC idle mode and a procedure in which the UE sets up a connection to the gNB to change from the RRC idle mode to the RRC connected mode.

Referring to FIG. 2E, when the UE transmitting and receiving data in the RRC connected mode receives or transmits no data for a certain reason or for a preset time, the gNB may transmit an RRCConnectionRelease message to the UE to change the UE to the RRC idle mode, in operation 2e-01. The UE (hereinafter, also referred to as an idle mode UE) in which no connection is currently established may perform, when data to be transmitted is generated, an RRC connection establishment process together with the gNB.

The UE may establish reverse transmission synchronization with the gNB through a random access process, and transmit an RRCConnectionRequest message to the gNB, in operation 2e-05. The RRCConnectionRequest message may include an identifier of the UE and a cause establishment-Cause for connection establishment.

The gNB may transmit an RRCConnectionSetup message to the UE to enable the UE to establish an RRC connection, in operation 2e-10. The RRCConnectionSetup message may include RRC connection configuration information, etc. Also, the RRCConnectionSetup message may include at least one information of bearer configuration information of the UE, configuration information of a PHY layer, configuration information of a MAC layer, configuration information of a RLC layer, configuration information of a PDCP layer, or configuration information of a SDAP layer.

The configuration information of the RLC layer may include an indicator defined to indicate whether to set the RLC layer to the RLC TM mode, the RLC UM mode, or the RLC AM mode and whether to set or activate the in-order delivery function for the RLC layer. The gNB may indicate the UE of a setting about an RLC mode and whether or not the in-order delivery function is set for each bearer or for each RLC layer, based on the configuration information of the RLC layer. When an indicator for setting or activating the in-order delivery function is included together with configuration information about the RLC mode in the configuration information of the RLC layer, the UE may set the RLC mode (for example, RLC TM, RLC UM or RLC AM) for the reception RLC layer, and perform an operation of the reception RLC layer to which the in-order delivery function is applied. When no indicator for setting or activating the in-order delivery function for the RLC layer is included in the configuration information of the RLC layer, the UE may perform an operation of the reception RLC layer to which the out-of-order delivery function is basically applied.

An RRC connection is also referred to as a Signaling Radio Bearer (SRB), and may be used to transmit and receive an RRC message which is a control message between a UE and a gNB. The UE which has established the RRC connection may transmit an RRCConnetionSetupComplete message to the gNB, in operation 2e-15. The RRCConnetionSetupComplete message may include a SERVICE REQUEST message as a control message through which the UE requests the MME to set a bearer for a preset service.

The gNB may transmit the SERVICE REQUEST message included in the RRCConnetionSetupComplete message to an Access and Mobility Management Function (AMF), in operation 2e-20, and the AMF may determine whether to provide the preset service requested by the UE. When the AMF determines to provide the preset service requested by the UE, the AMF may transmit an INITIAL CONTEXT SETUP REQUEST message to the gNB, in operation 2e-25. The INITIAL CONTEXT SETUP REQUEST message may include QoS information to be applied for a Data Radio Bearer (DRB) setting, security-related information (for example, a security key or a security algorithm) to be applied to the DRB, etc.

The gNB may exchange a SecurityModeCommand message with a SecurityModeComplete message to set security with the UE, in operations 2e-30 and 2e-35. When a security setting is completed, the gNB may transmit an RRCConnectionReconfiguration message to the UE, in operation 2e-40.

Also, the RRCConnectionReconfiguration message may include bearer configuration information of the UE, configuration information of the PHY layer, configuration information of the MAC layer, configuration information of the RLC layer, configuration information of the PDCP layer, or configuration information of the SDAP layer.

The configuration information of the RLC layer may include an indicator defined to indicate whether to set the RLC layer to the RLC TM mode, the RLC UM mode, or the RLC AM mode and whether to set or activate the in-order delivery function for the RLC layer. The gNB may indicate the UE of a setting about the RLC mode and whether or not the in-order delivery function is set for each bearer or for each RLC layer, based on the configuration information of the RLC layer. When an indicator for setting or activating the in-order delivery function is included together with configuration information about the RLC mode in the configuration information of the RLC layer, the UE may set the RLC mode (for example, RLC TM, RLC UM or RLC AM) for the reception RLC layer, and perform an operation of the reception RLC layer to which the in-order delivery function is applied. When no indicator for setting or activating the in-order delivery function for the RLC layer is included in the configuration information of the RLC layer, the UE may perform an operation of the reception RLC layer to which the out-of-order delivery function is basically applied.

The RRCConnectionReconfiguration message may include configuration information of a DRB by which user data is to be processed, and the UE may apply the configuration information of the DRB to set up the DRB, and transmit an RRCConnectionReconfigurationComplete message to the gNB, in operation 2e-45.

After the gNB completes DRB setup with the UE, the gNB may transmit an initial context setup complete message to the AMF, in operation 2e-50. The AMF may receive the initial context setup complete message, and perform a session management procedure with a User Plane Function (UPF) to establish a PDU session, in operation 2e-60. When the above-described process is completed, the UE may transmit/receive data to/from the gNB through the UPF, in operations 2e-65 and 2e-70.

As described above, a general data transmission process may be configured with three operations of RCC connection setup, security setup, and DRB setup. Also, the gNB may transmit an RRCConnectionReconfiguration message to newly set up, add, or change a setting to the UE for a certain reason, in operation 2e-75.

According to an embodiment of the disclosure, the bearer may have a meaning including a SRB and a DRB, wherein the SRB means a Signaling Radio Bearer and the DRB means a Data Radio Bearer. The SRB may be mainly used to transmit and receive RRC messages of the RRC layer, and the DRB may be mainly used to transmit and receive user layer data. Also, UM DRB means a DRB using the RLC layer operating in an Unacknowledged Mode (UM), and AM DRB means a DRB using the RLC layer operating in an Acknowledged Mode (AM).

Figure 2F:
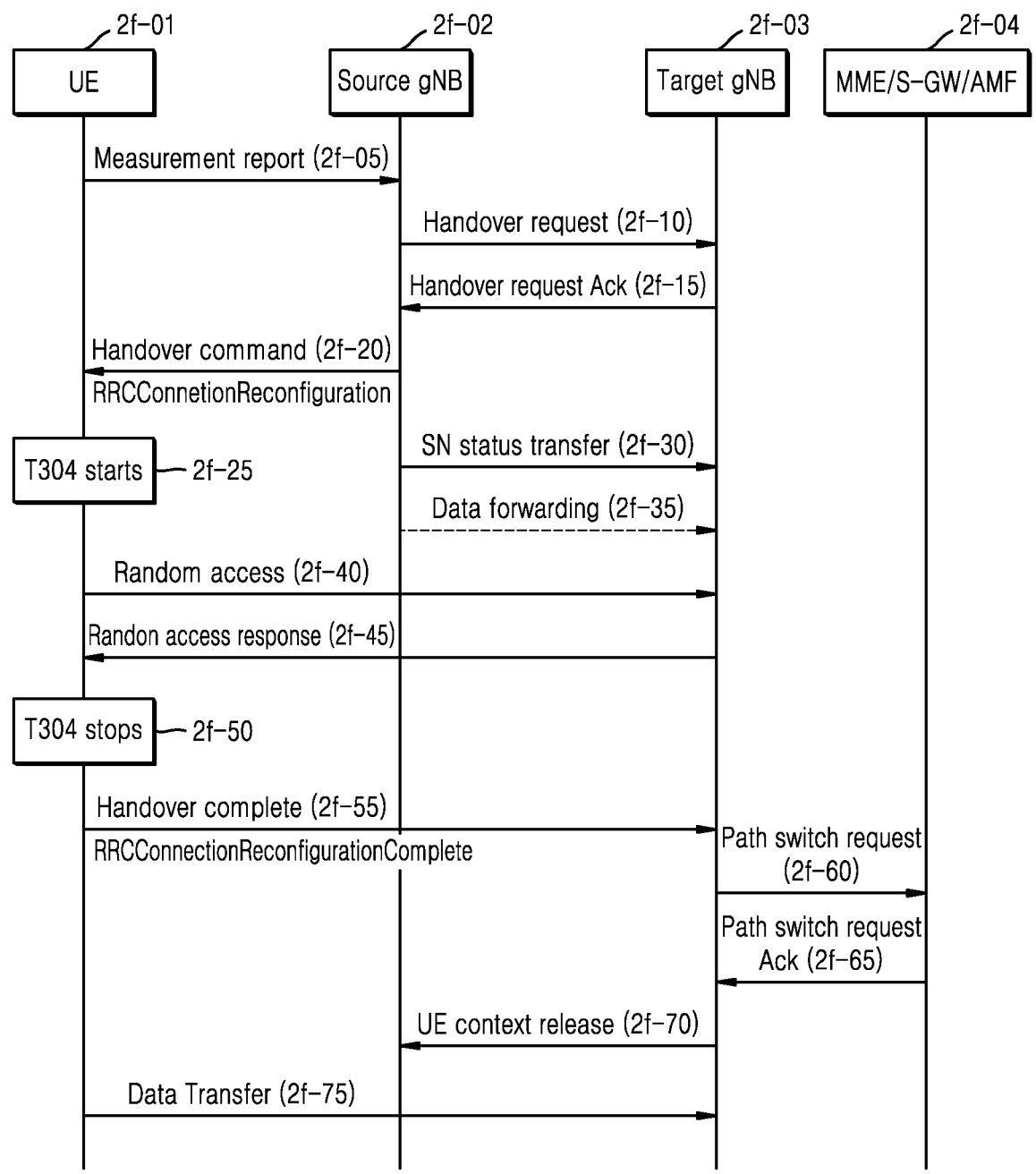
FIG. 2F shows a handover procedure in a next-generation mobile communication system according to an embodiment of the disclosure.

FIG. 2F shows a handover procedure in a next-generation mobile communication system according to an embodiment of the disclosure.

Referring to FIG. 2F, a UE 2f-01 which is in the RRC connected mode may send a cell measurement report to a source gNB 2f-02 periodically or when a preset event is satisfied, in operation 2f-05. The source gNB 2f-02 may determine whether to perform a handover of the UE 2f-01 to an adjacent cell based on the cell measurement information. The handover may be a technique of changing a source gNB providing a service to a UE being in a connected mode to another gNB (or another cell in the same gNB).

When the source gNB 2f-02 determines a handover, the source gNB 2f-02 may send a Handover (HO) request message to a new gNB, that is, a target gNB 2f-03 that is to provide a service to the UE 2f-01, thereby requesting a handover, in operation 2f-10. When the target gNB 2f-03 accepts the handover request, the target gNB 2f-03 may transmit a HO request Ack message to the source gNB 2f-02, in operation 2f-15. When the source gNB 2f-02 receives the HO request Ack message, the source gNB 2f-02 may transmit a HO command message to the UE 2f-01, in operation 2f-20. The source gNB 2f-02 may transfer the HO command message to the UE 2f-01 by using an RRC Connection Reconfiguration message, in operation 2f-20. When the UE 2f-01 receives the HO command message, the UE 2f-01 may stop data transmission/reception to/from the source gNB 2f-02, and start a T304 timer. The T304 timer may return the UE 2f-01 to its original setting and change the UE 2f-01 to the RRC idle state, when the UE 2f-01 fails to perform a handover to the target gNB 2f-03 within a preset time period. The source gNB 2f-02 may transfer a SN status about a transmission/reception status of uplink/downlink data to the target gNB 2f-03, and when there is downlink data, the source gNB 2f-02 may transfer the downlink data to the target gNB 2f-03, in operations 2f-30 and 2f-35. The UE 2f-01 may attempt a random access to a target cell indicated from the source gNB 2f-02, in operation 2f-40. The random access may be aimed to notify the target cell that the UE 2f-01 moves through a handover, while synchronizing an uplink. For the random access, the UE 2f-01 may transmit a preamble corresponding to a preamble ID received from the source gNB 2f-02 or a randomly selected preamble ID to the target cell. When a preset number of subframes elapse after the preamble is transmitted, the UE 2f-01 may monitor whether a Random Access Response (RAR) message is transmitted from the target cell. A time period in which the UE 2f-01 monitors whether the RAR message is transmitted is referred to as a RAR window. When a RAR message is received within the time period of the monitoring in operation 2f-45, the UE 2f-01 may transmit a HO complete message as an RRC Reconfiguration Complete message to the target gNB 2f-03, in operation 2f-55. When a random access response is successfully received from the target gNB 2f-03, the UE 2f-01 may stop the T304 timer, in operation 2f-50.

To correct paths of bearers set to the source gNB 2f-02, the target gNB 2f-03 may request a core network 2f-04 to correct paths in operations 2f-60 and 2f-65, and notify the source gNB 2f-02 of discarding UE context of the UE 2f-01, in operation 2f-70. Accordingly, the UE 2f-01 may attempt to receive data with respect to the target gNB 2f-03 from when the RAR window starts, and after the RAR message is received, the UE 2f-01 may transmit the RRCConnectionReconfigurationComplete message to the target gNB 2f-03 and start data transmission/reception to/from the target gNB 2f-03. According to an embodiment of the disclosure, the core network 2f-04 may include at least one of an MME, a S-GW, or an AMF, and further include at least one of a UPF or a SMF.

In the above-described handover procedure, when the source gNB 2f-02 transmits the HO command message (for example, an RRC Reconfiguration message) to the UE 2f-01, at least one of information about a target gNB to which the UE 2f-01 needs to perform a handover, information about a random access transmission resource for a cell, preamble information, bearer configuration information, or cell information may be set in the HO command message.

Also, the HO command message may include an indicator defined to indicate what kind of handover the UE 2f-01 needs to perform. For example, the source gNB 2f-01 may define indicators for a plurality of handover methods, and set one of the defined indicators such that the UE 2f-01 perform a handover method corresponding to the set indicator. The plurality of handover methods may include at least one method of a RACH-less handover method, an MBB handover method, an eMBB method, or a conditional handover method. Also, the HO command message may indicate whether to set or activate the in-order delivery function for each RLC layer of the UE 2f-01 through the indicator.

In an operation of a protocol layer of the next-generation mobile communication system described above with reference to FIG. 2D, an issue that data loss is generated in the PDCP layer due to the out-of-order delivery of the RLC layer may be generated.

For example, the reception PDCP layer may drive a PDCP reordering timer. The PDCP reordering timer may be driven or start when a PDCP SN gap is generated in the reception PDCP layer based on PDCP SNs, and the reception PDCP layer may transfer data to an upper layer in ascending order of the PDCP SNs or COUNT values when data corresponding to the PDCP SN gap does not arrive until the PDCP reordering timer is expired, and move after a PDCP SN transferring a reception window. Accordingly, when data corresponding to the PDCP SN gap arrives late after the PDCP reordering timer is expired, the arrived data may not be data in the reception window, and therefore, the reception PDCP layer may discard the data, resulting in data loss. A reason why data arrives late may be because several retransmissions of the RLC layer set to the RLC AM mode. However, a reason why the PDCP reordering timer is triggered may be because the reception RLC layer transfers data quickly to the upper layer through the out-of-order delivery function.

According to an embodiment of the disclosure, when AM DRB is set for a UE with an RRC message, a gNB may set the in-order delivery function with respect to a reception RLC layer for the UE. When long retransmission of the RLC layer is required or when data loss is fatal to a service, the gNB may set or activate the in-order delivery function with respect to the reception RLC layer.

Also, as shown in FIG. 2F, in the case that a handover method for reducing a data interruption time generated in a handover is indicated in a handover situation, for example, when a UE performs a handover while continuously transmitting/receiving data to/from a source gNB and simultaneously transmitting/receiving data to/from a target gNB to prevent any data transmission/reception interruption, each RLC layer may perform out-of-order delivery of data received from different gNBs when a reception PDCP layer of the UE needs to decipher downlink data with different security keys for the different gNBs or needs to perform a compression release procedure for releasing header compression in order. In this case, the reception PDCP layer may have high complexity in processing the out-of-order data. Accordingly, when a preset handover method is indicated in a HO command message, the gNB may cause the reception RLC layer of the UE to perform the in-order delivery function, or may indicate the RLC layer to perform the in-order delivery function together with an indicator indicating the preset handover method through the indicator. The indication for setting, activating or deactivating the in-order delivery function may be dynamically set by a transmitter (gNB or UE) by defining a new RLC control PDU instead of an RRC message.

After performing the handover, the UE may itself fall back to the out-of-order delivery function from the in-order delivery function. For example, after the UE transmits a handover completion message to the target gNB or when the UE drives a preset timer and then the preset timer is expired, the UE may fall back to the out-of-order delivery function from the in-order delivery function. A value of the preset timer may be indicated by the gNB through a handover command message. Alternatively, when the gNB indicates the out-of-order delivery function through an RRC message or a new RLC control PDU while the reception RLC layer of the UE continues to apply an in-order delivery function even after a handover is performed, the UE may change from the in-order delivery function to the out-of-order delivery function.

Hereinafter, a first embodiment for operations of the reception RLC layer proposed in the disclosure will be described in detail and proposed in regard of the RLC UM mode and the RLC AM mode.

In the first embodiment for operations of the reception RLC layer proposed in an embodiment of the disclosure, the out-of-order delivery function may be performed as a basic operation.

First, variables used for a window operation of the reception RLC layer in the RLC UM mode may be defined as follows.

RX_Next_Reassembly: state variable indicating a lowest or earliest RLC SN among data (RLC PDU or RLC SDU) considered to be reassembled in the reception RLC layer RX_Timer_Trigger: state variable indicating an RLC SN following an RLC SN triggering an RLC reassembly timer RX_Next_Highest: state variable indicating an RLC SN following a highest RLC SN among received data Detailed operations of a 1-1 embodiment when the reception RLC layer according to an embodiment of the disclosure operates in the RLC UM mode may be as follows.

The reception RLC layer may operate, when receiving a UMD PDU from a lower layer, as follows.

When no RLC SN is included in a header of the received UMD PDU,

Remove an RLC header and transfer an RLC SDU to an upper layer.

When an RLC SN is included in the header of the received UMD PDU and the RLC SN is equal to or greater than a RX_Next_Highest−UM_Window_Size value and smaller than a RX_Next_Reassembly value, Discard the received UMD PDU.

When an RLC SN is included in the header of the received UMD PDU and the RLC SN is smaller than the RX_Next_Highest−UM_Window_Size value and equal to or greater than the RX_Next_Reassembly value, Store the received UMD PDU in a reception buffer.

The reception RLC layer may operate in regard of the UMD PDU stored in the buffer in the above-described procedure, as follows. That is, when a UMD PDU having an RLC SN of a x value is stored in the buffer, the reception RLC layer may operate as follows.

When all segments having the RLC SN of the x value are received,

Reassemble all the segments having the RLC SN of the x value to configure an RLC SDU, remove an RLC header, and then transfer the RLC SDU to the upper layer.

When the x value is equal to the RX Next Reassembly value,

Update a RX_Next_Reassembly variable to a RLC SN of first data (or data having a lowest RLC SN among data having great RLC SNs) having a RLC SN that is greater than the current RX_Next_Reassembly value among data neither yet reassembled nor transferred to the upper layer.

When the x value of the RLC SN is out of an RLC reassembly window,

Update a RX_Next_Highest variable to x+1.

Discard all data corresponding to RLC SNs being out of the RLC reassembly window.

When the RX_Next_Reassembly value is out of the RLC reassembly window,

Set the RX_Next_Reassembly variable to the RLC SN of the first data (or data having the lowest RLC SN among the data having the great RLC SNs) having a RLC SN that is equal to or greater than the current RX_Next_Highest−UM_Window_Size value among the data neither yet reassembled nor transferred to the upper layer.

When the RLC reassembly timer is being driven,

When a RX_Timer_Trigger value is equal to or smaller than the RX_Next_Reassembly value, Or, when the RX_Timer_Trigger value is out of the RLC reassembly window and the RX_Timer_Trigger value is not equal to the RX Next Highest value, Or, when the RX_Next_Highest value is equal to a RX_Next_Reassembly+1 value and there is no segment lost before a final byte of all segments currently received for a RLC SDU having the RX_Next_Reassembly value as a RLC SN, Stop and initialize the RLC reassembly timer.

When the RLC reassembly timer is not driven (including a case in which the RLC reassembly timer stops according to a procedure), When the RX_Next_Highest value is greater than the RX_Next_Reassembly+1 value, Or, when the RX_Next_Highest value is equal to the RX_Next_Reassembly+1 value and there is at least one segment lost before a final byte of all segments currently received for a RLC SDU having the RX_Next_Reassembly value as a RLC SN, Start the RLC reassembly timer, and Set the RX_Timer_Trigger variable to the RX_Next_Highest value.

When the RLC reassembly timer is expired in the above-described procedure, the reception RLC layer may operate as follows.

Update the RX_Next_Reassembly variable to a RLC SN of first data (or data having a lowest RLC SN) having a RLC SN that is equal to or greater than the RX_Timer_Trigger value, the first data not yet reassembled.

Discard all segments having an RLC SN that is smaller than the updated RX_Next_Reassembly value.

When the RX_Next_Highest value is greater than the RX Next Reassumbly+1 value,

Or, when the RX_Next_Highest value is equal to the RX Next Reassumbly+1 value and there is at least one segment lost before a final byte of all segments currently received for a RLC SDU having the RX_Next_Reassembly value as a RLC SN, Start the RLC reassembly timer, and Set the RX_Timer_Trigger variable to the RX_Next_Highest value.

Figure 2G:
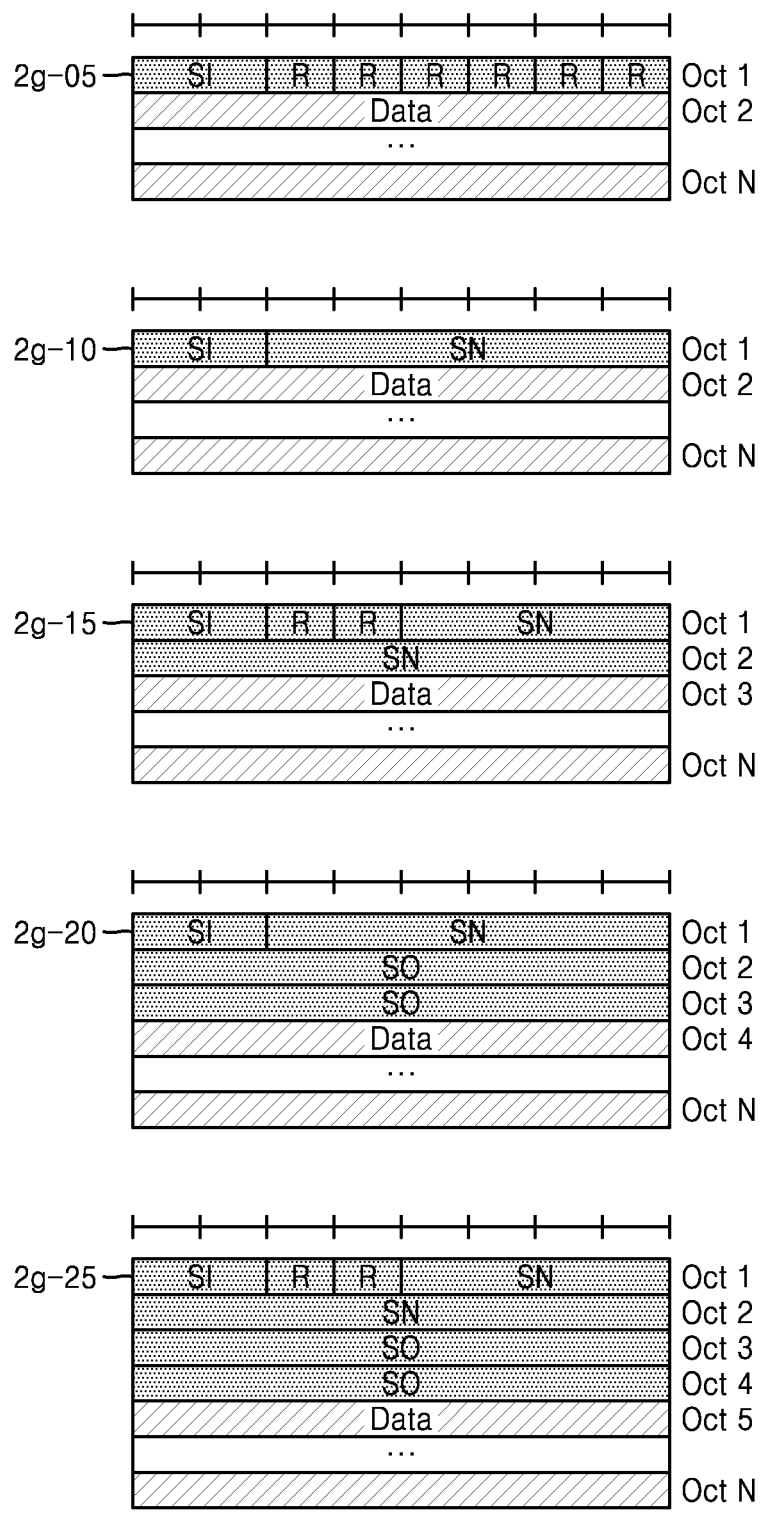
FIG. 2G shows RLC header formats that may be applied in a 1-1 embodiment which are operations of a reception RLC layer in which a RLC UM mode according to an embodiment of the disclosure is set.

FIG. 2G shows RLC header formats that may be applied in the 1-1 embodiment which are operations of the reception RLC layer in which the RLC UM mode according to an embodiment of the disclosure is set.

Referring to FIG. 2G, in the 1-1 embodiment which is an operation of the reception RLC layer in which the RLC UM mode according to an embodiment of the disclosure is set, when a transmission RLC layer transmits data (RLC SDU or RLC PDU) as complete data without segmenting the RLC SDU, the transmission RLC layer may apply a RLC header 2g-05 including a segmentation info (SI) field (indicating the complete data, a first segment, a final segment, or a middle segment being neither the first segment nor the final segment) without a RLC SN to the data and transmit the data, in the case that a 6-bit RLC SN has been set in the RLC layer. However, when the transmission RLC layer segments a RLC SDU and transmits segments, the transmission RLC layer may apply a RLC header 2g-10 including a RLC SN and a SI field to the first segment and transmit the first segment, and apply a RLC header 2g-20 including a RLC SN, a SI field, and a segment offset (SO) field (indicating a first byte segmented from the RLC SDU) to the middle or final segment and transmit the middle or final segment.

Also, when the transmission RLC layer transmits a RLC SDU as complete data without separating the RLC SDU, the transmission RLC layer may apply the RLC header 2g-05 including a SI field to the data without a RLC SN and transmit the data, in the case in which a 12-bit RLC SN has been set in the RLC layer. However, when the transmission RLC layer segments a RLC SDU and transmits segments, the transmission RLC layer may apply a RLC header 2g-15 including a RLC SN and a SI field to the first segment data and transmit the first segment, and apply a RLC header 2g-25 including a RLC SN, a SI field, and a SO field (indicating a first byte segmented from the RLC SDU) to the middle or final segment and transmit the middle or final segment.

Detailed operations of a 1-2 embodiment when the reception RLC layer according to an embodiment of the disclosure operates in the RLC AM mode may be as follows. In the RLC AM mode, the RLC layer may implement an ARQ function, receive an RLC status report (indicating successful data transfer with an RLC SN) from a receiving terminal, and retransmit data not successfully transmitted, thereby preventing data loss.

First, in the RLC AM mode, variables that are used for a window operation of the reception RLC layer may be defined as follows.

RX_Next: status variable indicating an RLC SN following a highest or final RLC SN among completely received data which is capable of being reassembled RX_Next_Status Trigger: status variable indicating an RLC SN following an RLC SN triggering the RLC assembly timer RX_Next_Highest: status variable indicating an RLC SN following a highest RLC SN among received data RX_Next_Highest Status: status variable indicating a highest RLC SN (for example, an RLC SN following a highest RLC SN successfully received) that may be indicated as ACK_SN in an RLC status report when the RLC status report is configured When the reception RLC layer receives an AMD PDU including y to z bytes of an RLC SDU having an RLC SN of a x value from a lower layer, the reception RLC layer may operate as follows.

When the RLC SN of the x value of the received AMD PDU is out of an RLC reception window, Or, when an AMD PDU including y to z bytes of an RLC SDU having the RLC SN of the x value has been previously received, Discard the received AMD PDU.

Otherwise,

Store the received AMD PDU in the reception buffer.

When a portion or segment included in the AMD PDU has been previously received,

Consider that the portion or segment included in the AMD PDU has been received in duplicate and discard the portion or segment.

The reception RLC layer may operate in regard of the AMD PDU stored in the reception buffer in the procedure, as follows. That is, when the AMD PDU having the RLC SN of the x value is stored in the reception buffer, the RLC layer may operate as follows.

When the RLC SN of the x value is equal to or greater than a RX_Next_Highest value,
  Update the RX_Next_Highest value to x+1
When all bytes of the RLC SDU corresponding to the RLC SN of the x value are received,
  Reassemble data or segments corresponding to the RLC SN of the x value to configure an RLC SDU, remove an RLC header, and then transfer the reassembled RLC SDU to an upper layer.
When the x value is equal to a RX_Highest_Status value,
  Update a RX_Highest_Status variable to an RLC SN of first data (having a lowest RLC SN) which is greater than the RX_Highest_Status value and of which all bytes are not yet completely received.
When the x value is equal to a RX_Next value,
  update a RX_Next variable to an RLC SN of first data (having a lowest RLC SN) which is greater than the RX_Next value and of which all bytes are not yet completely received.
When the RLC reassembly timer is being driven,
When a RX_Next_Status_Trigger value is equal to the RX_Next value,
Or, when the RX_Next_Status_Trigger value is equal to a RX_Next+1 value and there is no segment lost before a final byte of all segments currently received for a RLC SDU having the RX_Next value as a RLC SN,
Or, when the RX_Next_Status_Trigger value is out of an RLC reception window and the RX_Next_Status_Trigger value is not equal to a RX_Next+AM_Window_Size value,
  Stop and initialize the RLC reassembly timer.
When the RLC reassembly timer is not driven (including a case in which the RLC reassembly timer stops according to a procedure),
When the RX_Next_Highest value is greater than the RX_Next+1 value,
When the RX_Next_Highest value is equal to the RX_Next+1 value and there is at least one segment lost before a final byte of all segments currently received for an RLC SDU having the RX_Next value as an RLC SN,
  Start the RLC reassembly timer, and
  Set the RX_Next_Status_Trigger variable to the RX_Next_Highest value.
When the RLC reassembly timer is expired in the procedure, the reception RLC layer may operate as follows.
  Update the RX_Highest_Status variable to an RLC SN of first data (or data having a lowest RLC SN) not yet completely received, the RLSN SN being equal to or greater than the RX_Next_Status_Trigger value.
When the RX_Next_Highest value is greater than the RX_Next+1 value,
When the RX_Next_Highest value is equal to the RX_Next+1 value and there is at least one segment lost before a final byte of all segments currently received for an RLC SDU having the RX_Next value as an RLC SN,
  Start the RLC reassembly timer
  Set the RX_Next_Status_Trigger variable to the RX_Next_Highest value.

Figure 2H:
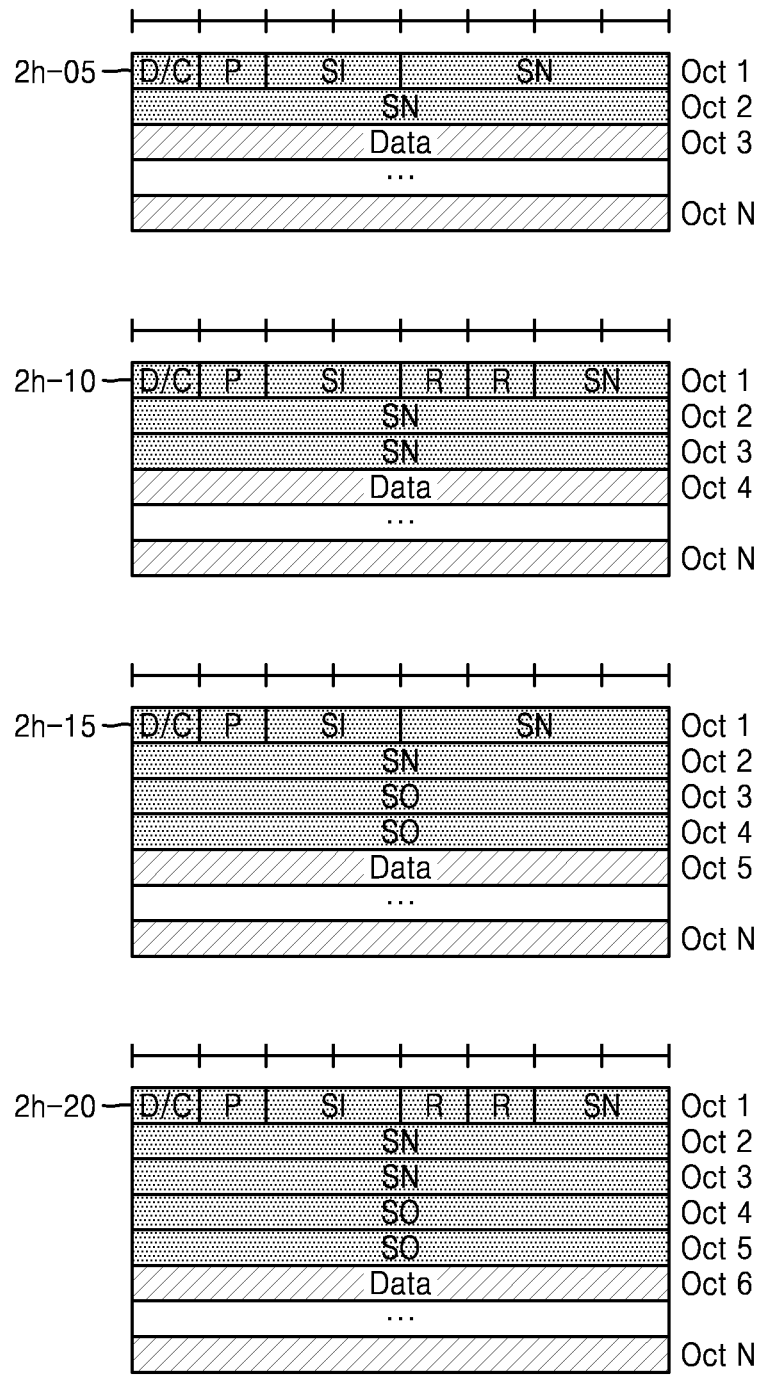
FIG. 2H shows RLC header formats that may be applied in a 1-2 embodiment which are operations of a reception RLC layer in which an RLC AM mode according to an embodiment of the disclosure is set.

FIG. 2H shows RLC header formats that may be applied in a 1-2 embodiment which are operations of the reception RLC layer in which the RLC AM mode according to an embodiment of the disclosure is set.

Referring to FIG. 2H, in the 1-2 embodiment which are the operations of the reception RLC layer in which the RLC AM mode according to an embodiment of the disclosure is set, when the transmission RLC layer transmits data (RLC SDU or RLC PDU) as complete data without segmenting the RLC SDU or when the transmission RLC layer transmits a first segment segmented from the RLC SDU, the transmission RLC layer may apply a RLC header 2h-05 including a RLC SN and a SI field (indicating the complete data, the first segment, a final segment, or a middle segment being neither the first segment nor the final segment) to the data and transmit the data, in the case that a 12-bit RLC SN has been set in the RLC layer. However, when the transmission RLC layer segments a RLC SDU and transmits segments, the transmission RLC layer may apply a RLC header 2h-15 including a RLC SN, a SI field, and a SO field (indicating a first byte segmented from the RLC SDU) to the middle or final segment and transmit the middle or final segment.

Also, in the 1-2 embodiment which are the operations of the reception RLC layer in which the RLC AM mode according to an embodiment of the disclosure is set, when the transmission RLC layer transmits data (RLC SDU or RLC PDU) as complete data without segmenting a RLC SDU or when the transmission RLC layer transmits a first segment segmented from a RLC SDU, the transmission RLC layer may apply, in the case that a 18-bit RLC SN has been set in the RLC layer, a RLC header 2h-10 including a RLC SN and a SI field (indicating the complete data, the first segment, a final segment, or a middle segment being neither the first segment nor the final segment) to the data and transmit the data. However, when the transmission RLC layer segments the RLC SDU and transmits segments, the transmission RLC layer may apply a RLC header 2h-20 including a RLC SN, a SI field, and a SO field (indicating a first byte segmented from the RLC SDU) to the middle or final segment and transmit the middle or final segment.

Hereinafter, a second embodiment for operations of the reception RLC layer proposed in the disclosure will be described in detail in regard of the RLC UM mode and the RLC AM mode.

In the second embodiment for the operations of the reception RLC layer according to an embodiment of the disclosure, the RLC layer may order data based on RLC SNs and transfer the data to an upper layer, when setting or activating of the in-order delivery function is indicated with an RRC message or a RLC control PDU by a gNB, although the RLC layer performs the out-of-order delivery function as a basic operation. Also, according to the above-described second embodiment, when the RLC layer applies the out-of-order delivery function, the RLC layer may immediately discard segments being out of the RLC reassembly window. However, when the in-order delivery function is set or activated, the RLC layer may attempt to reassemble, instead of immediately discarding the segments being out of the RLC reassembly window, the segments being out of the RLC reassembly window, transfer, when the segments are reassembled into complete RLC SDUs, the RLC SDUs to an upper layer in ascending order of RLC SNs, and discard segments that has failed to be reassembled into the complete RLC SDUs. Also, when the in-order delivery function is set or activated in the RLC layer, the RLC layer may order, instead of immediately reassembling a RLC SDU corresponding to a RLC SN when all bytes of the RLC SDU is received and transferring the RLC SDU to the upper layer, RLC SDUs in order of RLC SNs, then reassemble the RLC SDUs, and transfer the RLC SDUs to the upper layer in ascending order of the RLC SNs. When the out-of-order delivery function is applied to the RLC layer, the RLC layer may immediately reassemble an RLC SDU corresponding to an RLC SN when all bytes of the RLC SDU are received, and then transfer the RLC SDU to the upper layer.

First, variables that are used in a window operation of the reception RLC layer in the RLC UM mode may be defined as follows.

RX_Next_Reassembly: status variable indicating a lowest or earliest RLC SN among data (RLC PDU or RLC SDU) considered to be reassembled in the reception RLC layer.

RX_Timer_Trigger: status variable indicating an RLC SN following an RLC SN triggering the RLC reassembly timer RX_Next_Highest: status variable indicating an RLC SN following a highest RLC SN among received data Detailed operations of a 2-1 embodiment when the reception RLC layer according to an embodiment of the disclosure operates in the RLC UM mode may be as follows.

The reception RLC layer may operate, when receiving a UMD PDU from a lower layer, as follows.

When no RLC SN is included in a header of the received UMD PDU,

Remove an RLC header and transfer an RLC SDU to an upper layer.

When an RLC SN is included in the header of the received UMD PDU and the RLC SN is equal to or greater than a RX_Next_Highest−UM_Window_Size value and smaller than a RX_Next_Reassembly value, Discard the received UMD PDU.

When an RLC SN is included in the header of the received UMD PDU and the RLC SN is smaller than the RX_Next_Highest−UM_Window_Size value or equal to or greater than the RX_Next_Reassembly value, Store the received UMD PDU in a reception buffer.

The reception RLC layer may operate in regard of the UMD PDU stored in the buffer in the above-described procedure, as follows. That is, when a UMD PDU having an RLC SN of an x value is stored in the buffer, the reception RLC layer may operate as follows.

When all segments having the RLC SN of the x value are received,

When the in-order-delivery function is not set,

Reassemble all the segments having the RLC SN of the x value to configure an RLC SDU, remove an RLC header, and then transfer the resultant RLC SDU to an upper layer.

When the x value is equal to a RX_Next_Reassembly value,

Update a RX_Next_Reassembly variable to a RLC SN of first data (or data having a lowest RLC SN among data having great RLC SNs) among data neither yet reassembled nor transferred to an upper layer, the RLC SN being greater than the current RX_Next_Reassembly value.

Reassemble UMD PDUs having RLC SNs that are smaller than the updated RX_Next_Reassembly value into RLC SDUs, remove RLC headers, and transfer the reassembled RLC SDUs to the upper layer in ascending order of the RLC SNs when the reassembled RLC SDUs have never previously been transferred to the upper layer.

When the RLC SN of the x value is out of the RLC reassembly window,

Update a RX_Next_Highest variable to x+1.

When the in-order delivery function is not set,

Discard all data corresponding to RLC SNs being out of the RLC reassembly window.

Reassemble UMD PDUs having the RLC SNs being out of the RLC reassembly window into RLC SDUs, remove RLC headers, and transfer the reassembled RLC SDUs to the upper layer in ascending order of the RLC SNs when the reassembled RLC SDUs have never previously been transferred to the upper layer.

When the RX_Next_Reassembly value is out of the RLC reassembly window,

Set the RX_Next_Reassembly variable to the RLC SN of the first data (or data having the lowest RLC SN among the data having the great RLC SNs) among the data neither yet reassembled nor transferred to the upper layer, the RLC SN being equal to or greater than the current RX_Next_Highest−UM_Window_Size value.

When the RLC reassembly timer is being driven,

When a RX_Timer_Trigger value is equal to or smaller than the RX_Next_Reassumbly value, Or, when the RX_Timer_Trigger value is out of the RLC reassembly window and the RX_Timer_Trigger value is not equal to the RX_Next_Highest value, Or, when the RX_Next_Highest value is equal to a RX_Next_Reassembly+1 value and there is no segment lost before a final byte of all segments currently received for a RLC SDU having the RX_Next_Reassembly value as a RLC SN, Stop and initialize the RLC reassembly timer.

When the RLC reassembly timer is not driven (including a case in which the RLC reassembly timer stops according to a procedure), When the RX_Next_Highest value is greater than a RX_Next Reassumbly+1 value, Or, when the RX_Next_Highest value is equal to the RX_Next Reassumbly+1 value and there is at least one segment lost before a final byte of all segments currently received for a RLC SDU having the RX_Next_Reassembly value as a RLC SN, Start the RLC reassembly timer, and Set the RX_Timer_Trigger variable to the RX_Next_Highest value.

When the RLC reassembly timer is expired in the above-described procedure, the reception RLC layer may operate as follows.

Update the RX_Next_Reassembly variable to an RLC SN of first data (or data having a lowest RLC SN) not yet reassembled, the RLC SN being equal to or greater than the RX_Timer_Trigger value.

When the in-order delivery function is not set,

Discard all segments having RLC SNs that are smaller than the updated RX_Next_Reassembly value.

Reassemble UMD PDUs having RLC SNs that are smaller than the updated RX_Next_Reassembly value into RLC SDUs, remove RLC headers, and transfer the reassembled RLC SDUs to the upper layer in ascending order of the RLC SNs when the reassembled RLC SDUs have never previously been transferred to the upper layer.

When the RX_Next_Highest value is greater than a RX_Next Reassumbly+1 value,

Or, when the RX_Next_Highest value is equal to the RX_Next Reassumbly+1 value and there is at least one segment lost before a final byte of all segments currently received for a RLC SDU having the RX_Next_Reassembly value as a RLC SN, Start the RLC reassembly timer, and Set the RX_Timer_Trigger variable to the RX_Next_Highest value.

FIGS. 21A and 21B shows RLC header formats that may be applied in the 2-1 embodiment which are the operations of the reception RLC layer in which the RLC UM mode according to an embodiment of the disclosure is set.

Figure 2I:
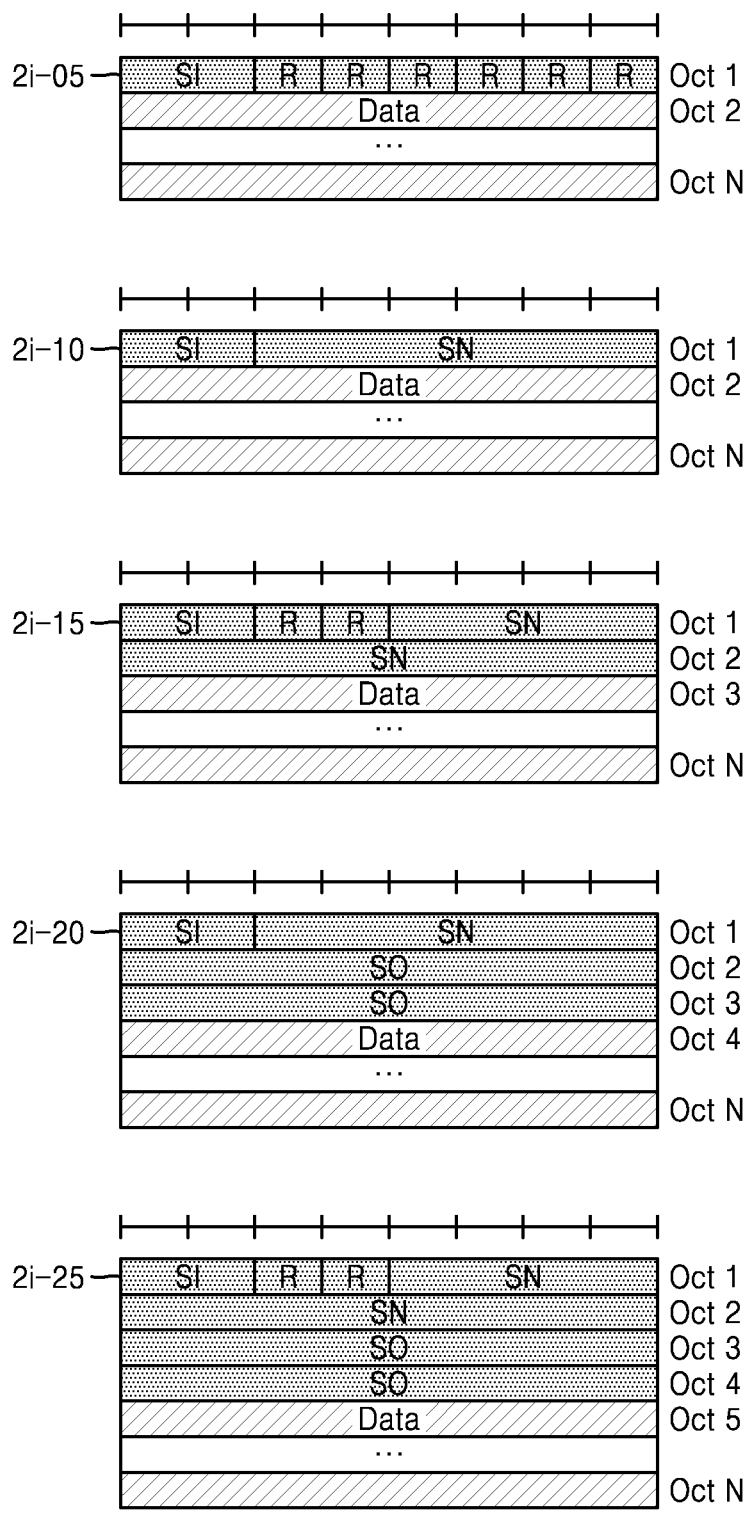
FIG. 2IA shows RLC header formats that may be applied in a 2-1 embodiment, and are operations of a reception RLC layer in which an RLC UM mode according to an embodiment of the disclosure is set.
Figure 2I:
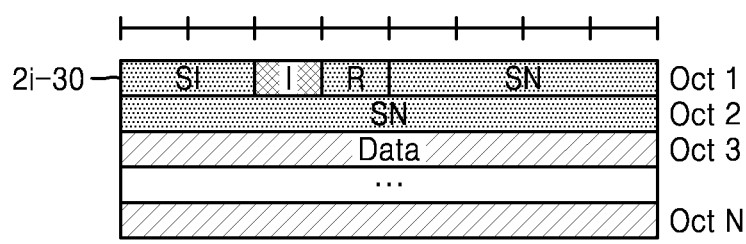
Figure 2I:
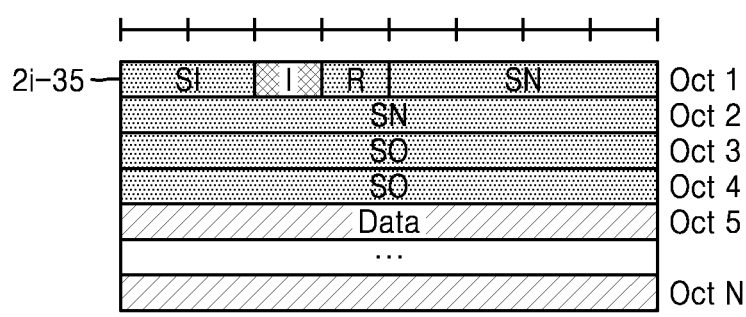
Figure 2I:
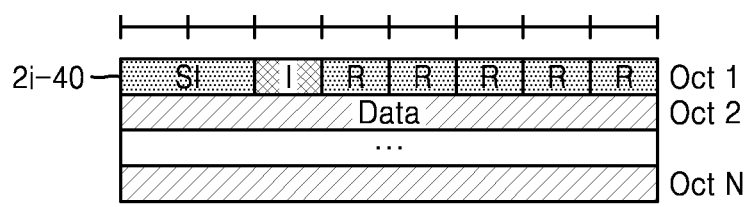

Referring to FIG. 2I, in the 2-1 embodiment which are the operations of the reception RLC layer in which the RLC UM mode according to an embodiment of the disclosure is set, when the in-order delivery function is not set, the transmission RLC layer may apply, when transmitting data (RLC SDU or RLC PDU) as complete data without segmenting the RLC SDU, a RLC header 2i-05 to the data and transmit the data in the case that a 6-bit RLC SN has been set in the RLC layer. The RLC header 2i-05 includes a SI field (indicating the complete data, a first segment, a final segment, or a middle segment being neither the first segment nor the final segment) without an RLC SN. However, when the transmission RLC layer segments a RLC SDU and transmits segments, the transmission RLC layer may apply a RLC header 2i-10 including a RLC SN and a SI field to a first segment and transmit the first segment, and apply a RLC header 2i-20 including a RLC SN, a SI field, and a SO field (indicating a first byte segmented from the RLC SDU) to a middle or final segment and transmit the middle or final segment.

Also, when the in-order delivery function is not set, the transmission RLC layer may apply, when transmitting data (RLC SDU or RLC PDU) as complete data without separating the RLC SDU, the RLC header 2i-05 including a SI field in the data without a RLC SN to the data and transmit the data, in the case in which a 12-bit RLC SN has been set in the RLC layer. However, when the transmission RLC layer segments a RLC SDU and transmits segments, the transmission RLC layer may apply a RLC header 2i-15 including a RLC SN and a SI field in the first segment and transmit the first segment, and apply a RLC header 2i-25 including a RLC SN, a SI field, and a SO field (indicating a first byte segmented from the RLC SDU) to the middle or final segment and transmit the middle or final segment.

In the 2-1 embodiment which are the operations of the reception RLC layer in which the RLC UM mode according to an embodiment of the disclosure is set, when the in-order delivery function is set, the transmission RLC layer may apply, when transmitting data (RLC SDU or RLC PDU) as complete data without segmenting the RLC SDU, a RLC header 2i-10 including a RLC SN and a SI field (indicating the complete data, a first segment, a final segment, or a middle segment being neither the first segment nor the final segment) to the data and transmit the data, in the case that a 6-bit RLC SN has been set in the RLC layer, such that the reception RLC layer is capable of ordering the data. However, when the transmission RLC layer segments a RLC SDU and transmits segments, the transmission RLC layer may apply the RLC header including a RLC SN and a SI field to the first segment and transmit the first segment, and apply the RLC header 2i-20 including a RLC SN, a SI field, and a SO field (indicating a first byte segmented from the RLC SDU) to the middle or final segment and transmit the middle or final segment.

According to another method, in the 2-1 embodiment which are the operations of the reception RLC layer in which the RLC UM mode according to an embodiment of the disclosure is set, when the in-order delivery function is set, the transmission RLC layer may apply, when transmitting data (RLC SDU or RLC PDU) as complete data without segmenting the RLC SDU, a RLC header 2i-30 including a RLC SN to the data and transmit the data, in the case that a 6-bit RLC SN has been set in the RLC layer such that the reception RLC layer is capable of ordering the data. The RLC header 2i-30 includes a 12-bit RLC SN and a SI field (indicating the complete data, a first segment, a final segment, or a middle segment being neither the first segment nor the final segment), a 1-bit I field, defined by the transmission RLC layer, indicating that the in-order delivery function is capable of being set or applied. That is, the transmission RLC layer may change a length of an RLC SN from 6 bits to 12 bits, and indicate the in-order delivery function with a 1-bit indicator. However, when the transmission RLC layer segments an RLC SDU and transmits segments, the transmission RLC layer may apply the RLC header 2i-30 to a first segment and transmit the first segment. The RLC header includes an RLC SN, a SI field and a 1-bit I field, defined by the transmission RLC layer, including an indication representing that the in-order delivery function is capable of being set or applied. Also, the transmission RLC layer may apply an RLC header 2i-35 to a middle or final segment and transmit the middle or final segment. The RLC header 2i-35 includes a RLC SN, a SI field, a SO field (indicating a first byte segmented from a RLC SDU), and a 1-bit I field, defined by the transmission RLC layer, including an indication representing that the in-order delivery function may be set or applied.

Also, when the in-order delivery function is set, the transmission RLC layer may apply, when transmitting data (RLC SDU or RLC PDU) as complete data without segmenting the RLC SDU, the RLC header 2i-15 including a RLC SN and a SI field and transmit the data, in the case that a 12-bit RLC SN has been set in the RLC layer. However, when the transmission RLC layer segments a RLC SDU and transmits segments, the transmission RLC layer may apply the RLC header 2i-15 including a RLC SN and a SI field to the first segment and transmit the first segment, and may apply the RLC header 2i-25 including a RLC SN, a SI field, and a SO field (indicating a first byte segmented from a RLC SDU) to the middle or final segment and transmit the middle or final segment.

According to another method, when the in-order delivery function is set, the transmission RLC layer may apply, when transmitting data (RLC SDU or RLC PDU) as complete data without segmenting the RLC SDU, the RLC header 2i-30 to the data and transmit the data, in the case that a 12-bit RLC SN has been set in the RLC layer. The RLC header 2i-30 includes an RLC SN, a SI field, and a 1-bit I field, defined by the transmission RLC layer, including an indication representing that the in-order delivery function is capable of being set or applied. However, when the transmission RLC layer segments a RLC SDU and transmits segments, the transmission RLC layer may apply the RLC header 2i-30 including a RLC SN, a SI field, and a 1-bit I field, defined by the transmission RLC layer, including an indication representing that the in-order delivery function is capable of being set or applied to the first segment and transmit the first segment, and apply the RLC header 2i-35 including a RLC SN, a SI field, a SO field (indicating a first byte segmented from a RLC SDU), and a 1-bit I field, defined by the transmission RLC layer, including an indication representing that the in-order delivery function is capable of being set or applied to the middle or final segment and transmit the middle or final segment.

According to an embodiment of the disclosure, the transmission RLC layer may define a I field in a header format of 2i-05, set the I field to 0 like a header format of 2i-40, and then apply the header format of 2i-40 to a RLC SDU not segmented in the case that the in-order delivery function is not set.

Also, when the in-order delivery function is set or activated, the transmission RLC layer may configure an RLC header format including the I field according to an embodiment of the disclosure and transmit data including the RLC header format. When the in-order delivery function is set or activated, the reception RLC layer may check the I field to identify an RLC SN, and order the received data. The reception RLC layer may immediately reassemble a RLC PDU of which an I field value is 0 without applying the in-order delivery function to the RLC PDU although the in-order delivery function is set, remove a RLC header, and then transfer the resultant RLC PDU to an upper layer (because the RLC PDU is data transmitted before the in-order delivery function is set).

Detailed operations of a 2-2 embodiment when the reception RLC layer according to an embodiment of the disclosure operates in the RLC AM mode may be as follows. In the RLC AM mode, the RLC layer may implement an ARQ function, receive an RLC status report (indicating successful data transfer with an RLC SN) from a receiving terminal, and retransmit data not successfully transmitted, thereby preventing data loss.

First, in the RLC AM mode, variables that are used for a window operation of the reception RLC layer may be defined as follows.

RX_Next: status variable indicating an RLC SN following a highest or final RLC SN among completely received data which is capable of being reassembled RX_Next_Status_Trigger: status variable indicating an RLC SN following an RLC SN triggering the RLC assembly timer RX_Next_Highest: status variable indicating an RLC SN following a highest RLC SN among received data RX_Next_Highest Status: status variable indicating a highest RLC SN (for example, an RLC SN following a highest RLC SN successfully received) that may be indicated as ACK SN in an RLC status report when the RLC status report is configured When the reception RLC layer receives an AMD PDU including y to z bytes of an RLC SDU having an RLC SN of a x value from a lower layer, the reception RLC layer may operate as follows.

When the RLC SN of the x value of the received AMD PDU is out of an RLC reception window, When an AMD PDU including y to z bytes of an RLC SDU having the RLC SN of the x value has been previously received, Discard the received AMD PDU.

Otherwise,

Store the received AMD PDU in the reception buffer.

When a portion or segment included in the AMD PDU has been previously received,

Consider that the portion or segment included in the AMD PDU has been received in duplicate and discard the portion or segment.

The reception RLC layer may operate in regard of the AMD PDU stored in the buffer in the above-described procedure, as follows. That is, when the AMD PDU having the RLC SN of the x value is stored in the buffer, the reception RLC layer may operate as follows.

When the x value of the RLC SN is equal to or greater than a RX_Next_Highest value, Update the RX_Next_Highest value to x+1

When all bytes of an RLC SDU corresponding to the x value of the RLC SN are received, When the in-order delivery function is not set, Reassemble data or segments corresponding to the x value of the RLC SN to configure an RLC SDU, remove an RLC header, and then transfer the reassembled RLC SDU to an upper layer, When the x value is equal to a RX_Next_Reassembly value, Update a RX Highest Status variable to an RLC SN of first data (having a lowest RLC SN) which is greater than the RX_Highest_Status value and of which all bytes are not yet completely received.

When the x value is equal to a RX_Next value, update a RX_Next variable to an RLC SN of first data (having a lowest RLC SN) which is greater than the RX_Next value and of which all bytes are not yet completely received.

Reassemble AMD PDUs having RLC SNs that are smaller than the updated RX Next value into RLC SDUs, remove RLC headers, and transfer the reassembled RLC SDUs to the upper layer in ascending order of the RLC SNs when the reassembled RLC SDUs have never previously been transferred to the upper layer.

When the RLC reassembly timer is being driven,

When a RX_Next_Status_Trigger value is equal to the RX_Next value,

Or, when the RX_Next_Status_Trigger value is equal to a RX_Next+1 value and there is no segment lost before a final byte of all segments currently received for a RLC SDU having the RX_Next value as a RLC SN, Or, when the RX_Next_Status_Trigger value is out of an RLC reception window and the RX_Next_Status_Trigger value is not equal to a RX_Next+AM_Window_Size value, Stop and initialize the RLC reassembly timer.

When the RLC reassembly time is not driven (including a case in which the RLC reassembly timer stops according to a procedure), When the RX_Next_Highest value is greater than the RX_Next+1 value, Or, when the RX_Next_Highest value is equal to the RX_Next+1 value and there is at least one segment lost before a final byte of all segments currently received for a RLC SDU having the RX_Next value as a RLC SN, Start the RLC reassembly timer, and Set the RX_Next_Status_Trigger variable to the RX_Next_Highest value.

When the RLC reassembly timer is expired in the above-described procedure, the reception RLC layer may operate as follows.

Update the RX Highest Status variable to an RLC SN of first data (data having a lowest RLC SN) not yet completely received, the RLC SN being equal to or greater than the RX_Next_Status_Trigger value.

When the RX_Next_Highest value is greater than the RX_Next+1 value,

Or, when the RX_Next_Highest value is equal to the RX_Next+1 value and there is at least one segment lost before a final byte of all segments currently received for a RLC SDU having the RX_Next value as a RLC SN, Start the RLC reassembly timer, and Set the RX_Timer_Status_Trigger variable to the RX_Next_Highest value.

Figure 2J:
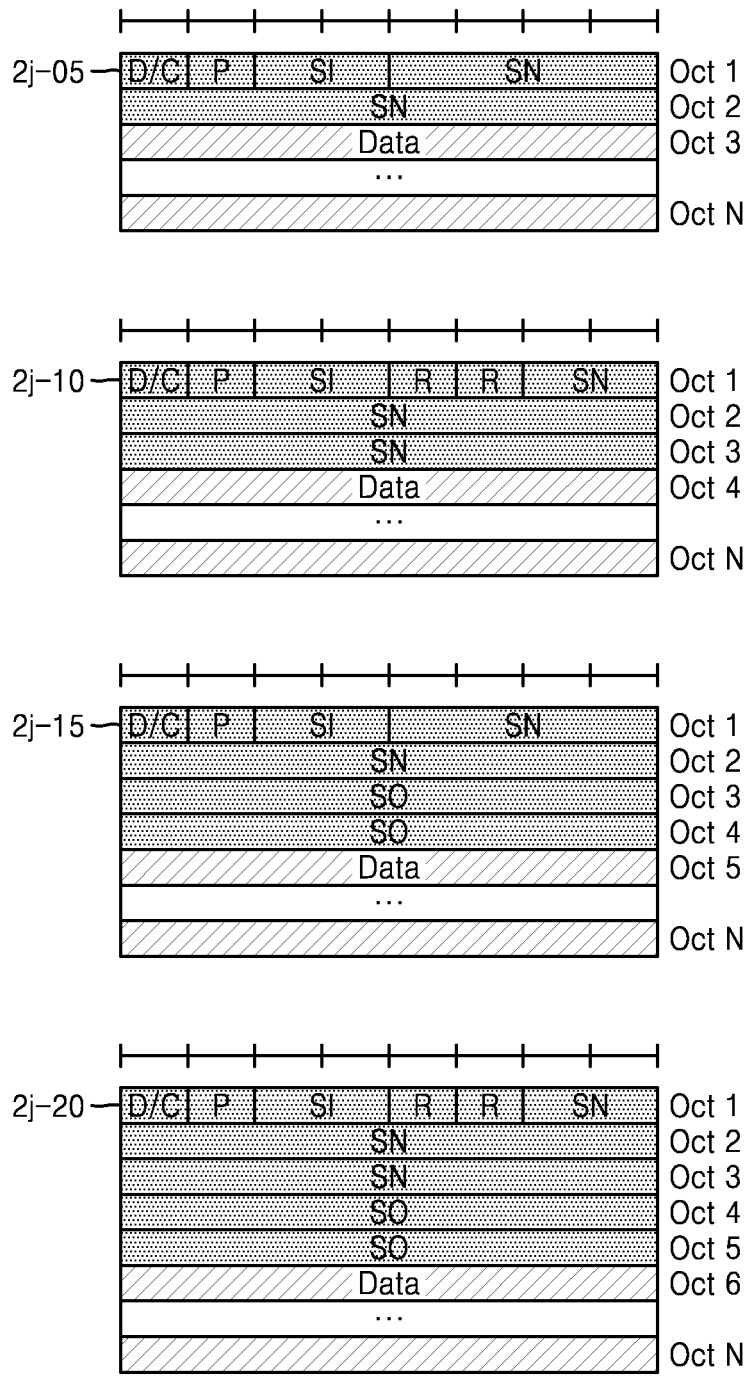
FIG. 2J shows RLC header formats that may be applied in a 2-2 embodiment which are operations of a reception RLC layer in which an RLC AM mode according to an embodiment of the disclosure is set.

FIG. 2J shows RLC header formats that may be applied in the 2-2 embodiment which are operations of the reception RLC layer in which the RLC AM mode according to an embodiment of the disclosure is set.

Referring to FIG. 2J, in the 2-2 embodiment which are operations of the reception RLC layer in which the RLC AM mode according to an embodiment of the disclosure is set, when the transmission RLC layer transmits data (RLC SDU or RLC PDU) as complete data without segmenting the RLC SDU or when the transmission RLC layer transmits a first segment segmented from the RLC SDU, the transmission RLC layer may apply, in the case that a 12-bit RLC SN has been set in the RLC layer, a RLC header 2*j*-05 including a RLC SN and a SI field (indicating the complete data, the first segment, a final segment, or a middle segment being neither the first segment nor the final segment) to the data and transmit the data. However, when the transmission RLC layer segments a RLC SDU and transmits segments, the transmission RLC layer may apply a RLC header 2*j*-15 including a RLC SN, a SI field, and a SO field (indicating a first byte segmented from the RLC SDU) to the middle or final segment and transmit the middle or final segment.

Also, in the 2-2 embodiment which are the operations of the reception RLC layer in which the RLC AM mode according to an embodiment of the disclosure is set, when the transmission RLC layer transmits data (RLC SDU or RLC PDU) as complete data without segmenting the RLC SDU or when the transmission RLC layer transmits a first segment segmented from the RLC SDU, the transmission RLC layer may apply, in the case that a 18-bit RLC SN has been set in the RLC layer, a RLC header 2*j*-10 including a RLC SN and a SI field (indicating the complete data, the first segment, a final segment, or a middle segment being neither the first segment nor the final segment) to the data and transmit the data. However, when the transmission RLC layer segments a RLC SDU and transmits segments, the transmission RLC layer may apply a RLC header 2*j*-20 including a RLC SN, a SI field, and a SO field (indicating a first byte segmented from the RLC SDU) to the middle or final segment and transmit the middle or final segment.

In the 2-2 embodiment which are the operations of the reception RLC layer in which the RLC AM mode according to an embodiment of the disclosure is set, because a RLC SN is included in each data unlike the RLC UM mode, the same RLC headers shown in FIG. 2J may be applied to both a case that the in-order delivery function is set and a case that the in-order delivery function is not set, according to lengths of RLC SNs, as described above. That is, in the RLC AM mode, the same RLC header format may be applied and used regardless of whether or not the in-order delivery function is set, unlike the RLC UM mode. According to another method, the transmission RLC layer may define a 1-bit indicator like the RLC UM mode to indicate that the in-order delivery function is set, and define and use an RLC header format.

Figure 2K:
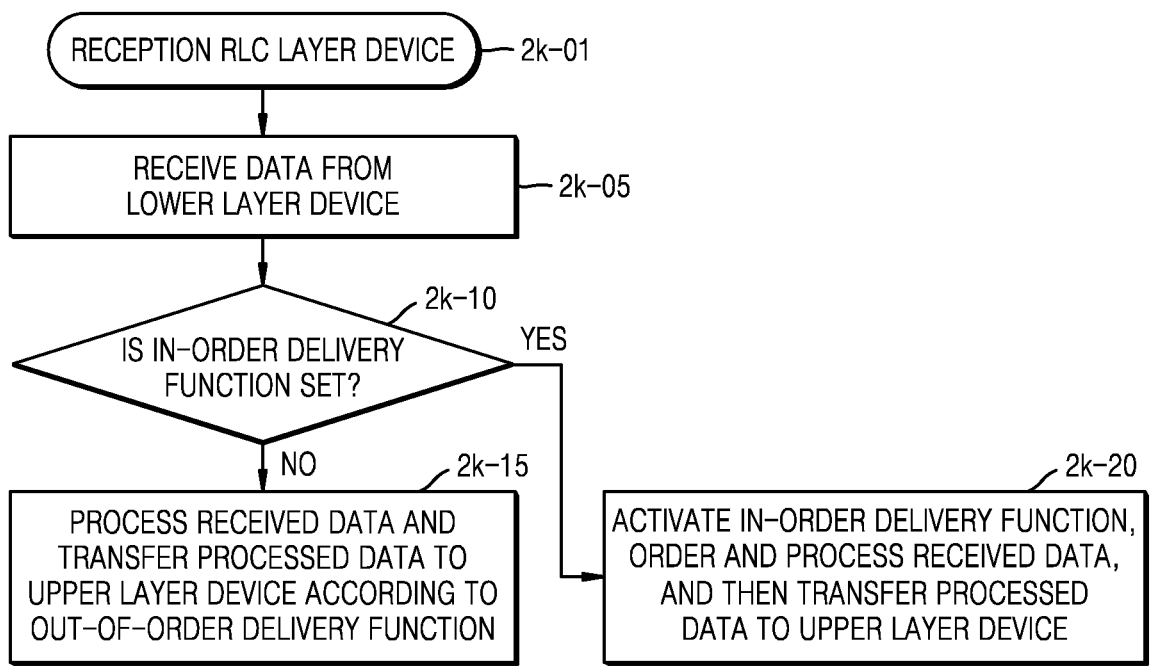
FIG. 2K shows operations of a reception RLC layer of a UE according to an embodiment of the disclosure.

FIG. 2K shows operations of a reception RLC layer of a UE according to an embodiment of the disclosure.

Referring to FIG. 2K, the reception RLC layer (2*k*-01) of the UE may receive data from a lower layer, in operation 2*k*-05.

The UE may determine whether the in-order delivery function is set, based on the received data, in operation 2*k*-10.

When the in-order delivery function is set, the UE may apply the above-described 2-1 embodiment to the RLC UM mode in consideration of a RLC header, and apply the above-described 2-2 embodiment to the RLC AM mode in consideration of a RLC header, in operation 2*k*-20. For example, the UE may activate the in-order delivery function to order and process the received data and transfer the resultant data to an upper layer.

When the in-order delivery function is not set, the UE may apply the 1-1 embodiment or the 2-1 embodiment for the reception RLC layer to the RLC UM mode in consideration of a RLC header, and apply the 1-2 embodiment or the 2-2 embodiment for the reception RLC layer to the RLC AM mode in consideration of a RLC header, in operation 2*k*-15. For example, the UE may process the received data and transfer the processed data to the upper layer according to the out-of-order delivery function.

Figure 2L:
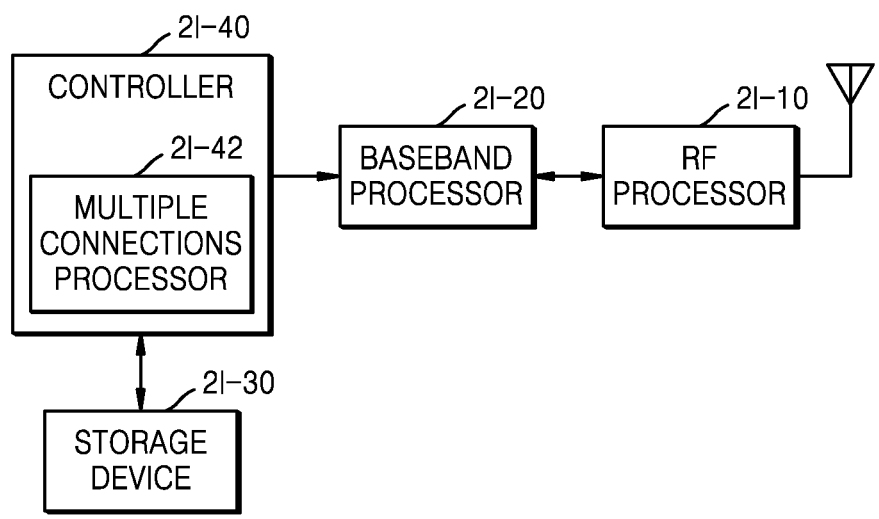
FIG. 2L shows a structure of a UE or a wireless node according to an embodiment of the disclosure.

FIG. 2L shows a structure of a UE or a wireless node to which an embodiment of the disclosure may be applied.

Referring to FIG. 2L, the UE may include an RF processor 21-10, a baseband processor 21-20, a storage device 21-30, and a controller 21-40. However, an internal structure of the UE is not limited to the embodiment shown in FIG. 2L, and the UE may include more or less components than those shown in FIG. 2L. The RF processor 21-10 may perform a function for transmitting and receiving signals through a wireless channel, such as band conversion, amplification, etc. of signals. That is, the RF processor 21-10 may up-convert a baseband signal provided from the baseband processor 21-20 into a RF band signal, transmit the RF band signal through an antenna, and down-convert an RF band signal received through the antenna into a baseband signal. For example, the RF processor 21-10 may include a transmission filter, a reception filter, an amplifier, a mixer, an oscillator, a DAC, an ADC, etc. In FIG. 21, a single antenna is shown, however, the UE may include a plurality of antennas. Also, the RF processor 21-10 may include a plurality of RF chains. Furthermore, the RF processor 21-10 may perform beamforming. For beamforming, the RF processor 21-10 may adjust phases and magnitudes of signals that are transmitted/received through the plurality of antennas or antenna elements. Also, the RF processor 21-10 may perform MIMO, and when MIMO is performed, the RF processor 21-10 may receive several layers. The RF processor 21-10 may perform sweeping of a received beam by appropriately setting the plurality of antennas or antenna elements according to a control of the controller 21-40, or may adjust a direction and width of a received beam such that the received beam coordinates with a beam that is to be transmitted.

The baseband processor 21-20 may perform a function of conversion between baseband signals and bit streams according to a physical layer specification of a system. For example, upon data transmission, the baseband processor 21-20 may encipher and modulate a transmission bit stream to generate complex symbols. Also, upon data reception, the baseband processor 21-20 may demodulate and decipher a baseband signal provided from the RF processor 21-10 to restore a reception bit stream. For example, according to an OFDM method, upon data transmission, the baseband processor 21-20 may encipher and modulate a transmission bit stream to generate complex symbols, map the complex symbols to subcarriers, and then construct OFDM symbols through IFFT and CP insertion. Also, upon data reception, the baseband processor 21-20 may segment a baseband signal provided from the RF processor 21-10 in units of OFDM symbols, restore signals mapped to subcarriers through FFT, and then restore a reception bit stream through demodulation and deciphering.

The baseband processor 21-20 and the RF processor 21-10 may transmit and receive signals as described above. Accordingly, the baseband processor 21-20 and the RF processor 21-10 are also referred to as a transmitter, a receiver, a transceiver, or a communicator. Furthermore, at least one of the baseband processor 21-20 or the RF processor 21-10 may include a plurality of communication modules to support a plurality of different radio access technologies. Also, at least one of the baseband processor 21-20 or the RF processor 21-10 may include different communication modules to process signals of different frequency bands. For example, the different radio access technologies may include a LET network, a NR network, etc.

Also, the different frequency bands may include a SHF (e.g., 2.1 GHz and 1 GHz) band and a mm wave (e.g., 60 GHz) band. The UE may transmit/receive a signal to/from a gNB by using the baseband processor 21-20 and the RF processor 21-10, wherein the signal may include control information and data.

The storage device 21-30 may store data, such as basic programs, application programs, and configuration information, for operations of the UE. The storage device 21-30 may provide the stored data according to a request from the controller 21-40. The storage device 21-30 may be configured with storage media, such as ROM, RAM, a hard disc, CD-ROM, DVD, and the like, or a combination of such storage media. Also, the storage device 21-30 may be configured with a plurality of memories.

The controller 21-40 may control overall operations of the UE. For example, the controller 21-40 may transmit and receive signals through the baseband processor 21-20 and the RF processor 21-10. Also, the controller 21-40 may write data in the storage device 21-30 or read data from the storage device 21-30. To write or read data, the controller 21-40 may include at least one processor. For example, the controller 21-40 may include a communication processor CP for performing control for communication, and an application processor AP for controlling an upper layer of an application program, etc. Also, the controller 21-40 may include multiple connection processor 21-42 for processing multiple connections. Also, the controller 21-40 may control the UE to perform a method for processing communication data described above. Also, at least one component of the UE may be implemented as a single chip.

Figure 2M:
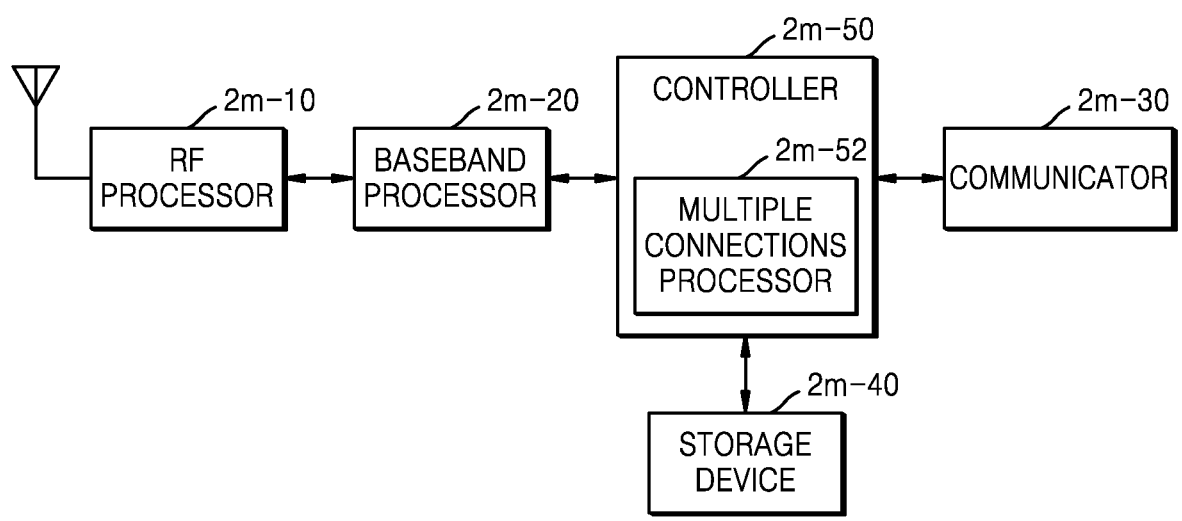
FIG. 2M shows a block configuration of a TRP or a wireless node in a wireless communication system according to an embodiment of the disclosure.

FIG. 2M shows a block configuration of a TRP or a wireless node in a wireless communication system according to an embodiment of the disclosure.

Referring to FIG. 2M, a gNB (also, referred to as a TRP or a wireless node) may include a RF processor 2m-10, a baseband processor 2m-20, a backhaul communicator 2m-30, a storage device 2m-40, and a controller 2m-50. However, an internal structure of the gNB is not limited to the embodiment shown in FIG. 2M, and the gNB may include more or less components than those shown in FIG. 2M.

The RF processor 2m-10 may perform a function for transmitting and receiving signals through a wireless channel, such as band conversion, amplification, etc. of signals. That is, the RF processor 2m-10 may up-convert a baseband signal provided from the baseband processor 2m-20 into a RF band signal, transmit the RF band signal through an antenna, and down-convert an RF band signal received through the antenna into a baseband signal. For example, the RF processor 2m-10 may include a transmission filter, a reception filter, an amplifier, a mixer, an oscillator, a DAC, an ADC, etc. In FIG. 2M, a single antenna is shown, however, the gNB may include a plurality of antennas. Also, the RF processor 2m-10 may include a plurality of RF chains. Furthermore, the RF processor 2m-10 may perform beamforming. For beamforming, the RF processor 2m-10 may adjust phases and magnitudes of signals that are transmitted/received through the plurality of antennas or antenna elements. The RF processor 2m-10 may perform downlink MIMO by transmitting one or more layers.

The baseband processor 2m-20 may perform a function of conversion between baseband signals and bit streams according to a physical layer specification of first radio access technology. For example, upon data transmission, the baseband processor 2m-20 may encipher and modulate a transmission bit stream to generate complex symbols. Also, upon data reception, the baseband processor 2m-20 may demodulate and decipher a baseband signal provided from the RF processor 2m-10 to restore a reception bit stream. For example, according to the OFDM method, upon data transmission, the baseband processor 2m-20 may encipher and modulate a transmission bit stream to generate complex symbols, map the complex symbols to subcarriers, and then construct OFDM symbols through IFFT and CP insertion. Also, upon data reception, the baseband processor 2m-20 may segment a baseband signal provided from the RF processor 2m-10 in units of OFDM symbols, restore signals mapped to subcarriers through FFT, and then restore a reception bit stream through demodulation and deciphering. The baseband processor 2m-20 and the RF processor 2m-10 may transmit and receive signals as described above. Accordingly, the baseband processor 2m-20 and the RF processor 2m-10 are also referred to as a transmitter, a receiver, a transceiver, or a wireless communicator. The gNB may transmit/receive a signal to/from the UE by using the baseband processor 2m-20 and the RF processor 2m-10, wherein the signal may include control information and data.

The communicator 2m-30 may provide an interface for communicating with other nodes in a network.

The storage device 2m-40 may store data, such as basic programs, application programs, and configuration information, for operations of the gNB. Particularly, the storage device 2m-40 may store information about a bearer assigned to a UE connected to the gNB, a measurement result reported from the connected UE, etc. Also, the storage device 2m-40 may store information that is used as a determination criterion about whether to provide multiple connections to the UE or whether to release multiple connections to the UE. Also, the storage device 2m-40 may provide the stored data according to a request from the controller 2m-50. The storage device 2m-40 may be configured with storage media, such as ROM, RAM, a hard disc, CD-ROM, DVD, and the like, or a combination of such storage media. Also, the storage device 2m-40 may be configured with a plurality of memories.

The controller 2m-50 may control overall operations of the gNB. For example, the controller 2m-50 may transmit and receive signals through the baseband processor 2m-20 and the RF processor 2m-10 or through the backhaul communicator 2m-30. Also, the controller 2m-50 may write data in the storage device 2m-40 or read data from the storage device 2m-40. To write or read data, the controller 2m-50 may include at least one processor. Also, the controller 2m-50 may include multiple connection processor 2m-52 for processing multiple connections. For example, the controller 2m-50 may control the gNB such that the UE may perform a method for performing communication data as described above. Also, at least one component in the gNB may be implemented as a single chip.

The methods according to the embodiments of the disclosure described in claims or specification thereof may be implemented in hardware, software, or a combination of hardware and software.

When the methods are implemented in software, a computer-readable storage medium storing at least one program (software module) may be provided. The at least one program stored in the computer-readable storage medium may be configured for execution by at least one processor within an electronic device. The at least one program may include instructions that cause the electronic device to execute the methods according to the embodiments of the disclosure described in the claims or specification thereof.

The program (software module or software) may be stored in RAM, a non-volatile memory including a flash memory, ROM, an electrically erasable programmable ROM (EEPROM), a magnetic disc storage device, CD-ROM, DVDs or other types of optical storage devices, and a magnetic cassette. Alternatively, the program may be stored in a memory that is configured as a combination of some or all of the memories. A plurality of such memories may be included.

Furthermore, the program may be stored in an attachable storage device that may be accessed through communication networks such as the Internet, Intranet, a local area network (LAN), a wide LAN (WLAN), and a storage area network (SAN) or a communication network configured in a combination thereof. The storage device may access a device performing the embodiments of the disclosure through an external port. Further, a separate storage device on the communication network may also access the device performing the embodiments of the disclosure.

In the embodiments of the disclosure, a component included in the disclosure is expressed in a singular or plural form depending on the described embodiments of the disclosure. However, singular or plural expressions are selected to be suitable for the presented situations for convenience, and the disclosure is not limited to the singular or plural form. A component expressed in a plural form may be configured as a single component, or a component expressed in a singular form may be configured as a plurality of components.

The disclosed embodiments provide an apparatus and method capable of effectively providing a service to a mobile communication system.

Meanwhile, the embodiments of the disclosure disclosed in the present specification and the drawings are specific examples intended to easily describe the technical content of the disclosure and help understanding the disclosure, not intended to limit the scope of the disclosure. That is, it is apparent to those skilled in the art that other modified examples based on the technical spirit of the disclosure may be executed. Also, the embodiments may be combined and used as needed. For example, some parts of the embodiments of the disclosure may be combined to operate the gNB and UE. Also, the embodiments of the disclosure may be applied to other communication systems, and other modified examples based on the technical concept of the embodiments may also be executed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a source base station in a wireless communication system, the method comprising:
    transmitting, to a terminal, a handover command message, wherein the handover command message comprises a packet data convergence protocol (PDCP) configuration information;
    forwarding data to a plurality of candidate target base stations;
    receiving, from a target base station among the plurality of candidate target base stations, information indicating handover completion; and
    transmitting, to at least one candidate target base station other than the target base station, information indicating to discard the forwarded data,
    wherein a PDCP status report for a radio bearer is received from the terminal according to an execution of a conditional handover to the target base station in case that the PDCP configuration information comprises information indicating that the PDCP status report is required.

2. The method of claim 1, wherein the forwarded data comprises downlink data and uplink data for performing data transmission and reception with the terminal.

3. The method of claim 1, wherein the radio bearer is an acknowledged mode (AM) data radio bearer (DRB).

4. The method of claim 1, wherein the handover command message comprises information of the plurality of candidate target base stations and information of conditions for conditional handover.

5. The method of claim 4, wherein the target base station is identified, by the terminal, among the plurality of candidate target base stations based on the information of conditions for conditional handover.

6. A source base station in a wireless communication system, the source base station comprising:
    a transceiver; and
    at least one controller configured to:
        transmit, to a terminal, a handover command message, wherein the handover command message comprises a packet data convergence protocol (PDCP) configuration information,
        forward data to a plurality of candidate target base stations,
        receive, from a target base station among the plurality of candidate target base stations, information indicating handover completion, and
        transmit, to at least one candidate target base station other than the target base station, information indicating to discard the forwarded data,
    wherein a PDCP status report for a radio bearer is received from the terminal according to an execution of a conditional handover to the target base station in case that the PDCP configuration information comprises information indicating that the PDCP status report is required.

7. The source base station of claim 6, wherein the forwarded data comprises downlink data and uplink data for performing data transmission and reception with the terminal.

8. The source base station of claim 6, wherein the radio bearer is an acknowledged mode (AM) data radio bearer (DRB).

9. The source base station of claim 6, wherein the handover command message comprises information of the plurality of candidate target base stations and information of conditions for conditional handover.

10. The source base station of claim 9, wherein the target base station is identified, by the terminal, among the plurality of candidate target base stations based on the information of conditions for conditional handover.

* * * * *